(12) United States Patent
Chien

(10) Patent No.: US 10,326,921 B2
(45) Date of Patent: Jun. 18, 2019

(54) LIGHT DEVICE HAS BUILT-IN CAMERA AND RELATED DIGITAL DATA DEVICE'S FUNCTIONS

(71) Applicant: Tseng-Lu Chien, Walnut, CA (US)

(72) Inventor: Tseng-Lu Chien, Walnut, CA (US)

(*) Notice: Subject to any disclaimer, the term of this patent is extended or adjusted under 35 U.S.C. 154(b) by 0 days.

(21) Appl. No.: 14/863,553

(22) Filed: Sep. 24, 2015

(65) Prior Publication Data

US 2016/0100086 A1 Apr. 7, 2016

Related U.S. Application Data

(63) Continuation-in-part of application No. 14/793,209, filed on Jul. 7, 2015, now Pat. No. 9,549,110, which (Continued)

(51) Int. Cl.
*G06K 9/20* (2006.01)
*G08B 13/196* (2006.01)
(Continued)

(52) U.S. Cl.
CPC .......... *H04N 5/2256* (2013.01); *G01J 5/0025* (2013.01); *G06K 9/20* (2013.01);
(Continued)

(58) Field of Classification Search
USPC ......... 396/427, 433; 362/254, 255, 455, 640
See application file for complete search history.

(56) References Cited

U.S. PATENT DOCUMENTS 5,107,120 A * 4/1992 Tom .................. G01J 5/34
250/338.3

5,434,764 A * 7/1995 Lee .................. F21S 8/033
250/239
(Continued)

OTHER PUBLICATIONS https://www.amazon.com/Motion-Light-Security-Camera-Included/dp, Security Camera. "Motion Ligth w/Security Camera, 1 GB SD card included." First Listed on Amazon Mar. 16, 2008.*

*Primary Examiner* — Clayton E. LaBalle
*Assistant Examiner* — Linda B Smith
(74) *Attorney, Agent, or Firm* — Bacon & Thomas, PLLC

(57) ABSTRACT

A Light device having built-in Camera to operate desire digital data functions is powered by an power source for a lamp-holder, light source, flashlight or light device connected to power source by prongs or a bulb-base with conductive contacts to get power. The device may take the form of an IP cam, or Driving Cam, or webcam having but not limited add for auto tracking or one of plurality functions to make different products and functions with optional retractable prongs that plug directly into a wall outlet or insert into existing lamp base or incorporate conductive wire to make electric connection at least one of built-in camera, storage unit, wireless kits, Bluetooth kits, APP communication unit, motion sensor, light device. The said motion sensor and digital data related device(s) including but not limited all kind of camera may in separated housing with night-vision assembly selected from light source, IR diodes, low light camera lens & IC & circuits so people can upgrade the non-camera device to has built-in camera and digital device for their old non-camera security light. The motion sensor head or PIR has digital data output to work with wireless communication parts to avoid the analog model for mutual interfere the signals to cause false functions of light source or wifi or APP or wireless related functions.

30 Claims, 17 Drawing Sheets

Related U.S. Application Data is a continuation-in-part of application No. 14/728,369, filed on Jun. 2, 2015, now Pat. No. 9,787,885, which is a continuation-in-part of application No. 14/265,838, filed on Apr. 30, 2014, now Pat. No. 9,197,865, which is a continuation-in-part of application No. 13/295,301, filed on Nov. 14, 2011, now Pat. No. 8,760,514.

(51) Int. Cl.
*H04N 5/225* (2006.01)
*H04N 7/18* (2006.01)
*G01J 5/00* (2006.01)
*H04N 5/232* (2006.01)
*H04N 5/33* (2006.01)

(52) U.S. Cl.
CPC . *G08B 13/19619* (2013.01); *G08B 13/19636* (2013.01); *G08B 13/19695* (2013.01); *H04N 5/2252* (2013.01); *H04N 5/23206* (2013.01); *H04N 5/33* (2013.01); *H04N 7/183* (2013.01); *G08B 13/19656* (2013.01)

(56) References Cited

U.S. PATENT DOCUMENTS

| | | | | |
|---|---|---|---|---|
| 5,655,829 A * | 8/1997 | Lin | F21V 21/02 | 362/145 |
| 5,662,411 A * | 9/1997 | Haslam | F21V 23/0442 | 250/353 |
| 5,946,404 A * | 8/1999 | Bakshi | G08B 13/19619 | 16/383 |
| 6,100,803 A * | 8/2000 | Chang | F21V 21/30 | 250/221 |
| 6,686,952 B1 * | 2/2004 | Brazier | G08B 13/19619 | 348/143 |
| 6,933,854 B1 * | 8/2005 | Burgess | G08B 7/06 | 340/691.1 |
| 7,321,783 B2 * | 1/2008 | Kim, II | B60R 25/102 | 348/E5.002 |
| 8,461,991 B2 * | 6/2013 | Botha | F21V 23/0442 | 340/541 |
| 8,599,254 B2 * | 12/2013 | Zittel | H04N 7/183 | 348/143 |
| 8,820,961 B2 * | 9/2014 | Kim | F21S 8/086 | 348/143 |
| 8,820,984 B2 * | 9/2014 | Gillio | H05B 37/029 | 362/372 |
| 8,872,964 B2 * | 10/2014 | Reed | H05B 37/0227 | 315/158 |
| 8,926,139 B2 * | 1/2015 | Reed | F21V 23/0478 | 315/117 |
| 9,574,763 B2 * | 2/2017 | Chen | F21V 33/0052 | |
| 2003/0046469 A1 * | 3/2003 | Liu | G06F 13/409 | 710/301 |
| 2003/0197807 A1 * | 10/2003 | Wu | G08B 13/19619 | 348/375 |
| 2004/0109059 A1 * | 6/2004 | Kawakita | H04N 7/18 | 348/143 |
| 2004/0161978 A1 * | 8/2004 | Nakamura | H01R 33/94 | 439/638 |
| 2004/0212678 A1 * | 10/2004 | Cooper | G08B 13/19602 | 348/155 |
| 2005/0085131 A1 * | 4/2005 | Sutherland | H01R 33/94 | 439/642 |
| 2005/0174473 A1 * | 8/2005 | Morgan | F21S 48/325 | 348/370 |
| 2005/0185398 A1 * | 8/2005 | Scannell, Jr. | A01G 9/02 | 362/227 |
| 2006/0039570 A1 * | 2/2006 | Yeh | H04R 1/028 | 381/82 |
| 2006/0193151 A1 * | 8/2006 | Quan | F21S 8/033 | 362/640 |
| 2007/0013513 A1 * | 1/2007 | Tang | G08B 13/19634 | 340/541 |
| 2007/0257195 A1 * | 11/2007 | Reibel | G08B 13/19 | 250/342 |
| 2008/0068841 A1 * | 3/2008 | Chi | F21V 23/0442 | 362/276 |
| 2008/0151050 A1 * | 6/2008 | Self | G08B 13/19658 | 348/143 |
| 2008/0225120 A1 * | 9/2008 | Stuecker | G08B 13/19626 | 348/155 |
| 2008/0252730 A1 * | 10/2008 | Hong | G08B 13/19 | 348/155 |
| 2008/0259161 A1 * | 10/2008 | Hellman | G08B 13/19695 | 348/148 |
| 2009/0059603 A1 * | 3/2009 | Recker | H05B 37/0272 | 362/362 |
| 2009/0295923 A1 * | 12/2009 | Moore | G08B 13/19623 | 348/152 |
| 2010/0118148 A1 * | 5/2010 | Lee | F21V 3/00 | 348/164 |
| 2010/0327766 A1 * | 12/2010 | Recker | H02J 9/02 | 315/291 |
| 2011/0134239 A1 * | 6/2011 | Vadai | F21S 2/00 | 348/143 |
| 2012/0220307 A1 * | 8/2012 | Wohlert | H04W 4/02 | 455/456.1 |
| 2012/0293652 A1 * | 11/2012 | Farmer | F21V 29/20 | 348/143 |
| 2013/0169814 A1 * | 7/2013 | Liu | H04N 7/183 | 348/151 |
| 2014/0240493 A1 * | 8/2014 | Bang | G08B 13/19695 | 348/143 |
| 2015/0077567 A1 * | 3/2015 | Scalisi | H04N 5/23238 | 348/152 |
| 2017/0223807 A1 * | 8/2017 | Recker | H05B 37/0227 | |

\* cited by examiner

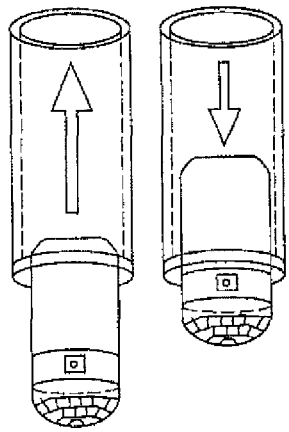
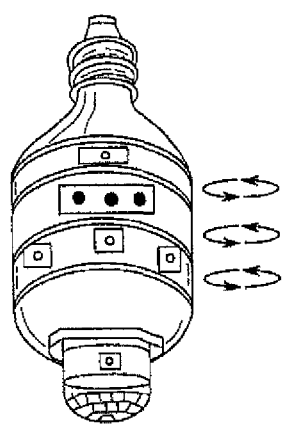
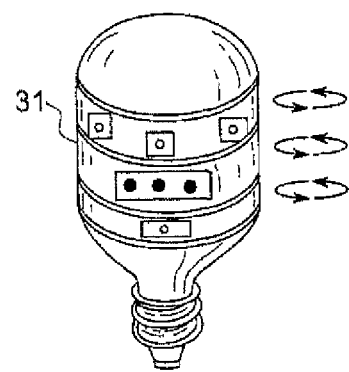
Fig. 3A     Fig. 3B     Fig. 4A
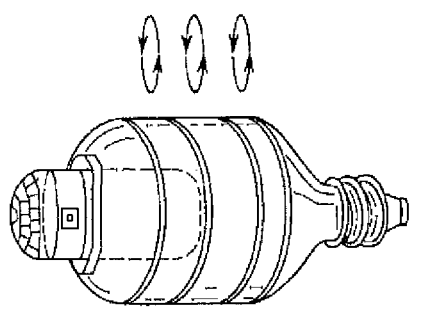
Fig. 3C
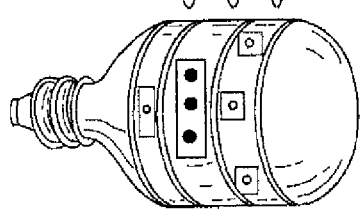

Fig. 4B

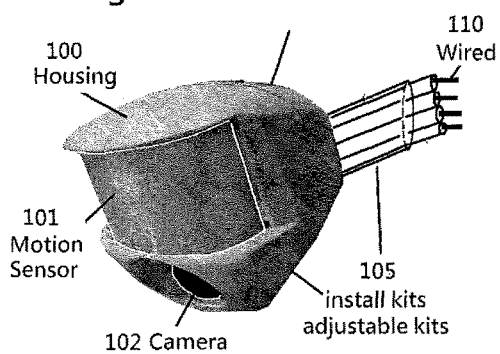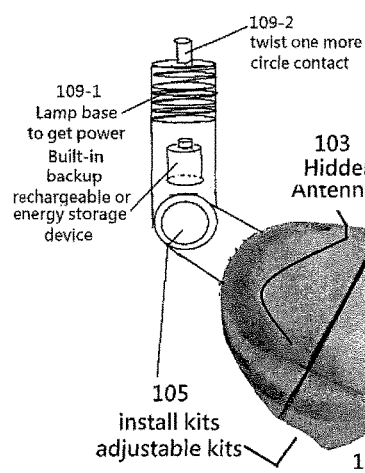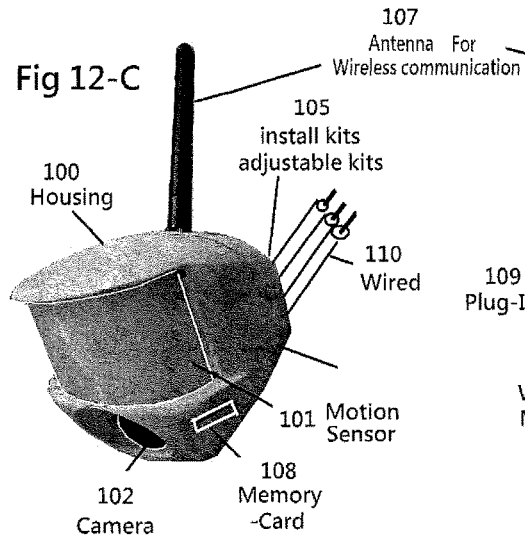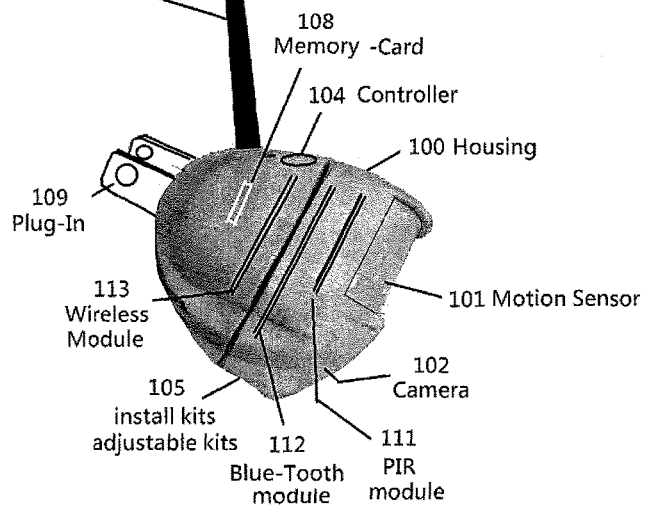

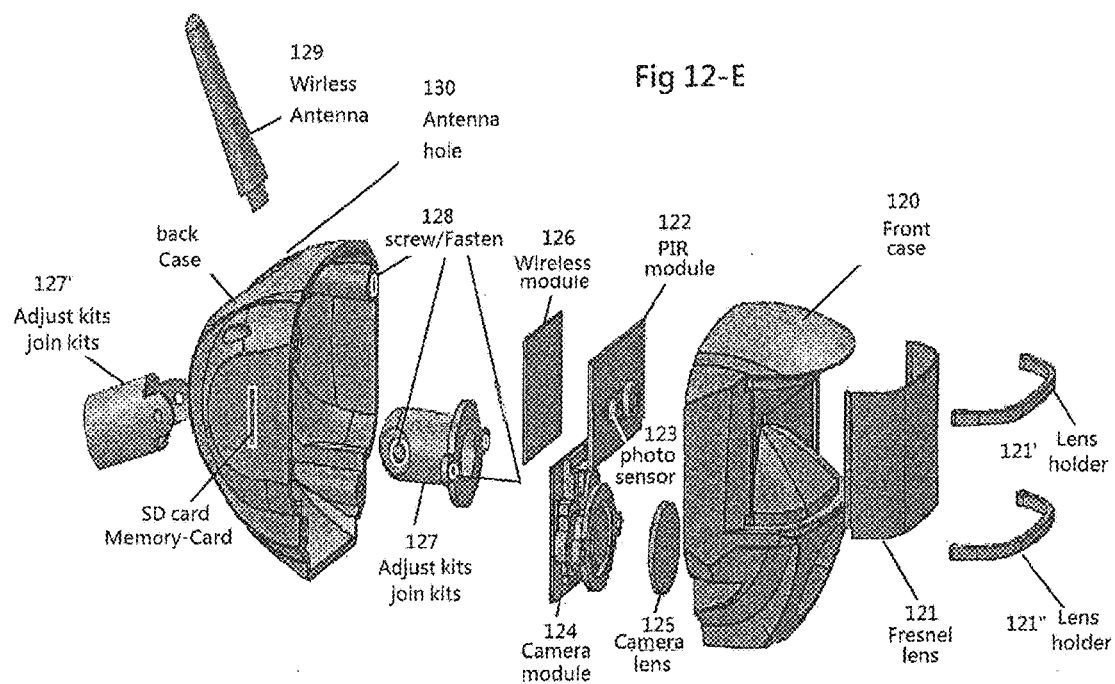

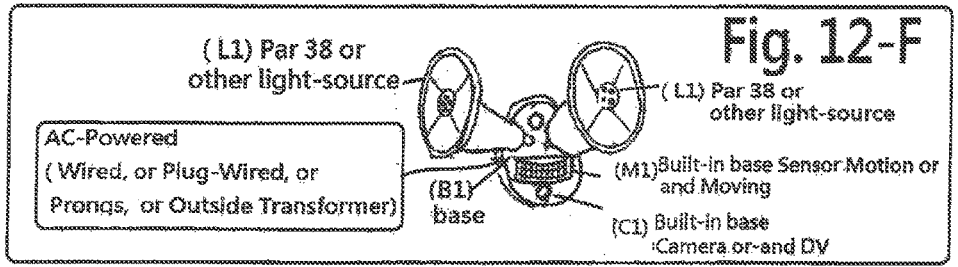
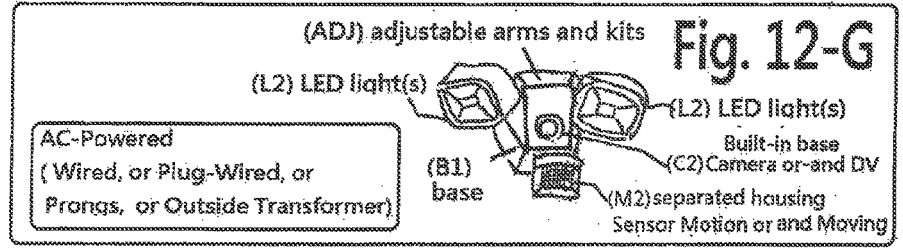
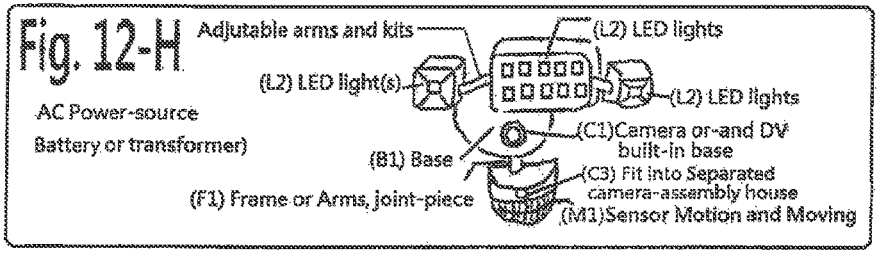
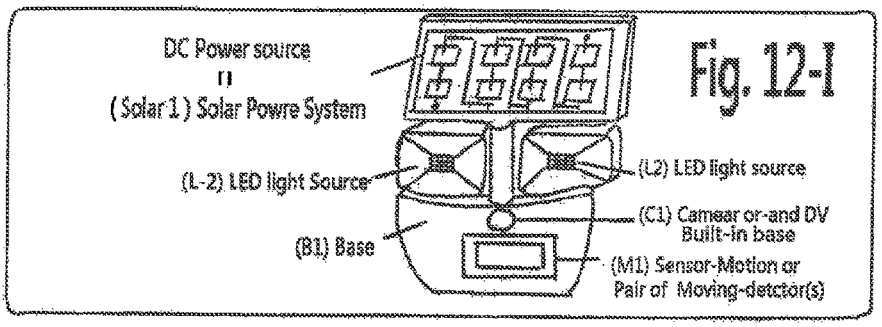
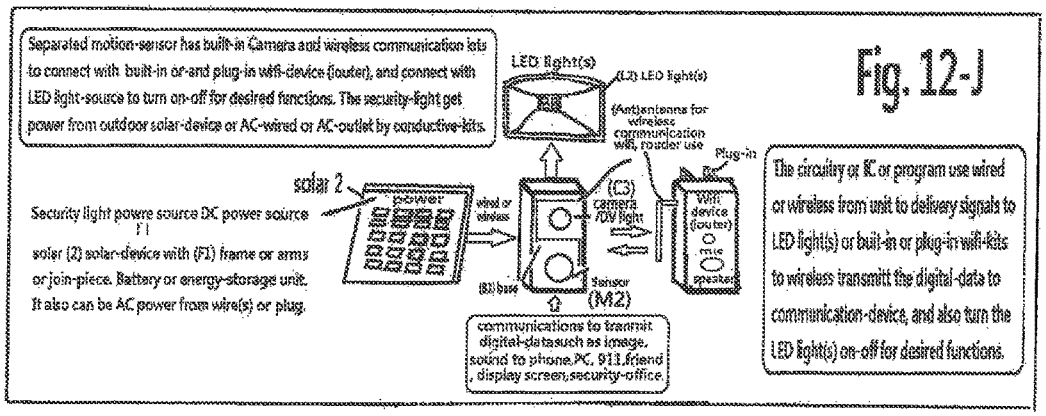

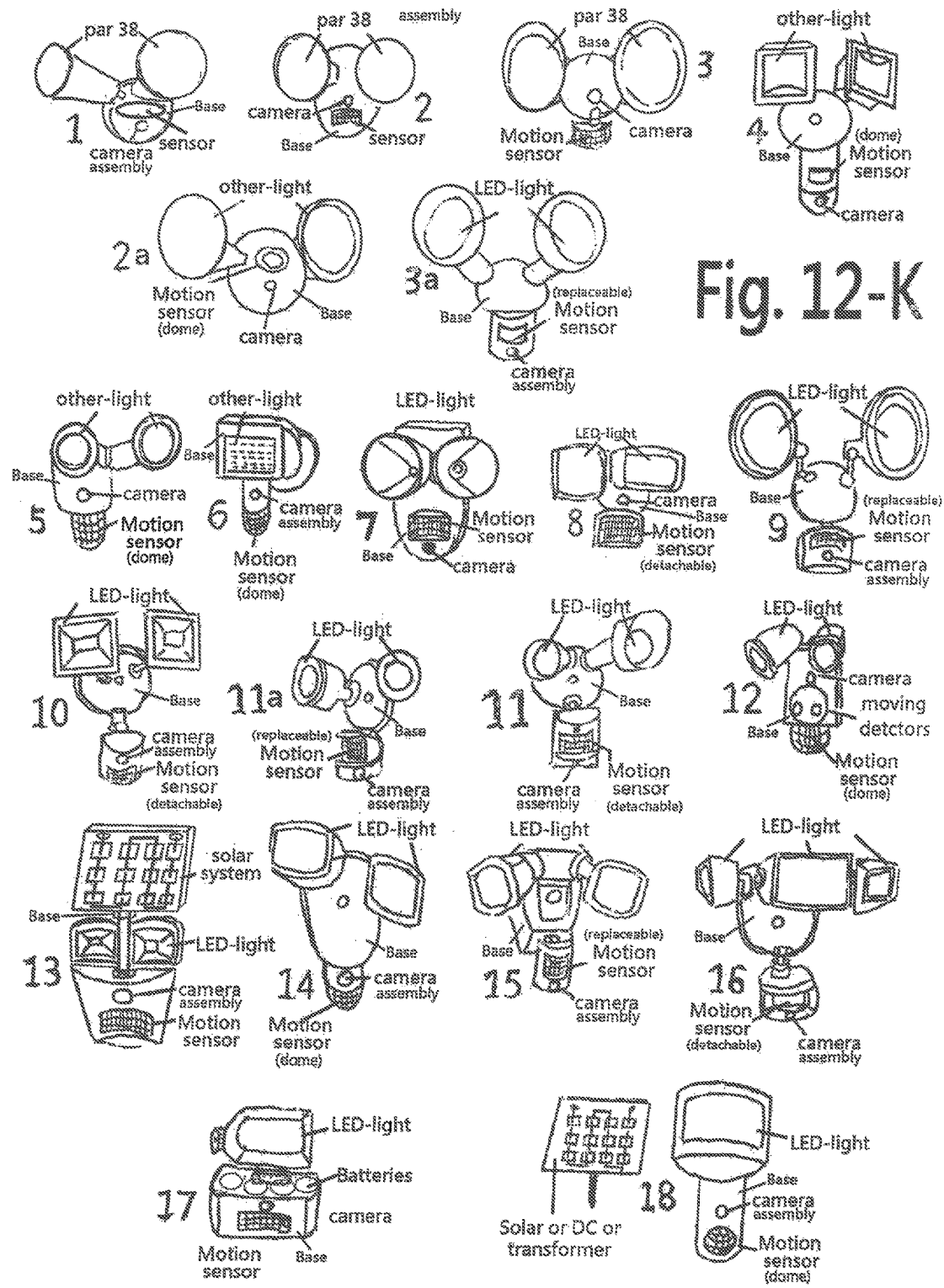

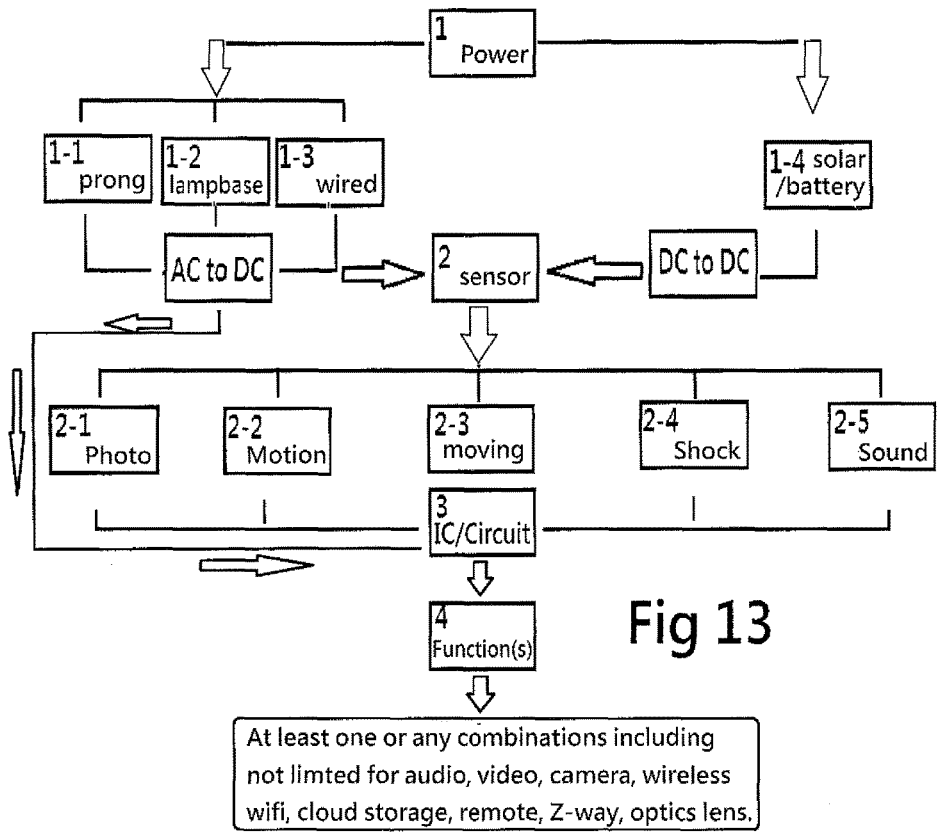
Fig 13
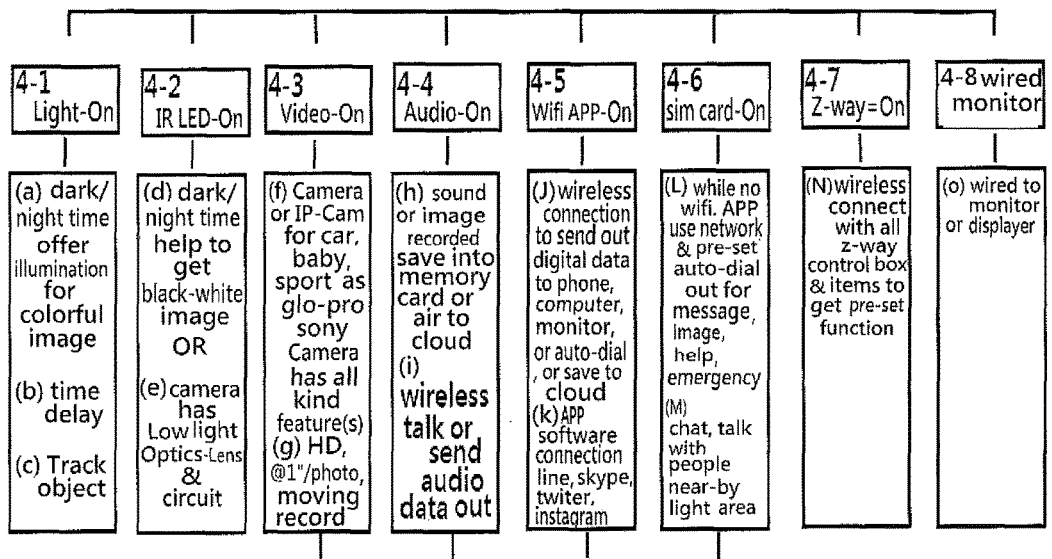

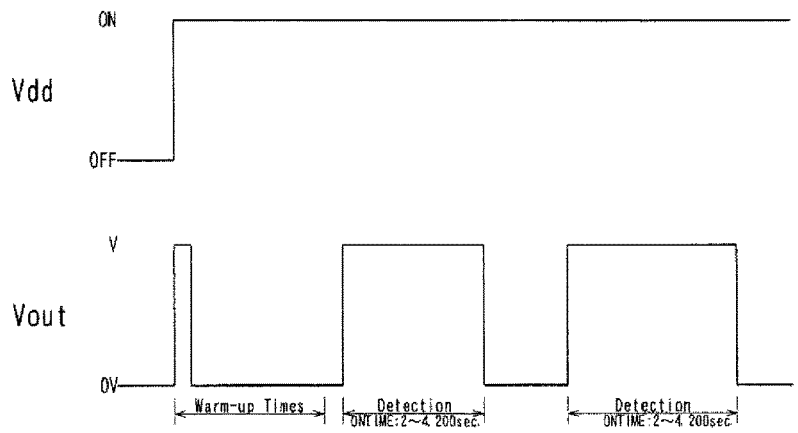
Cautions) Warm-up Time: Max. 30 sec.
Regarding of detection or non-detection during the waiting time, ON signal may be made due to Instability of circuit
Fig.2 : Timing Chart
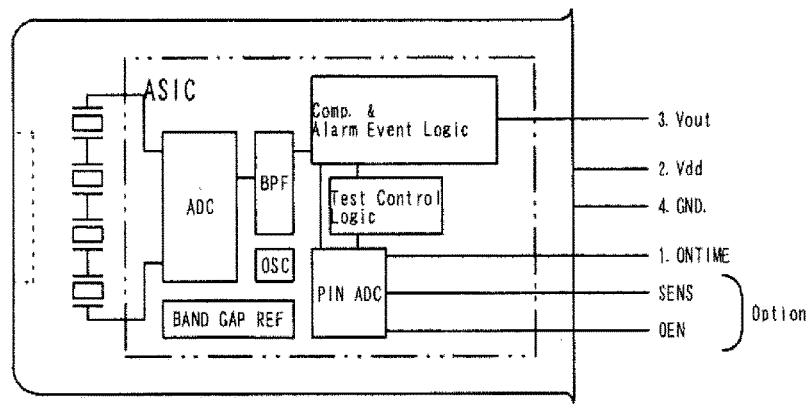
See Fig.5,6
Fig.3 : Circuit Configuration
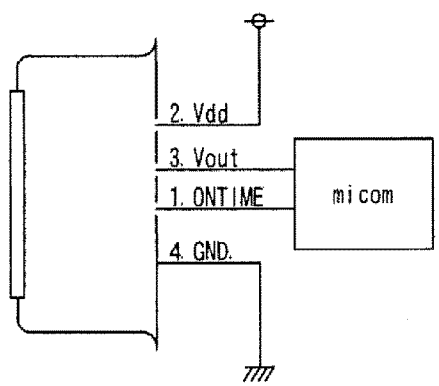
Fig 14
Fig.4 : Connection Diagram

LIGHT DEVICE HAS BUILT-IN CAMERA AND RELATED DIGITAL DATA DEVICE'S FUNCTIONS

This application is a continuation-in-part of U.S. patent application Ser. No. 14/793,209, filed Jun. 30, 2015, which is a continuation-in-part of U.S. patent application Ser. No. 14/728,369, filed Jun. 2, 2015, which is a continuation-in-part of U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 14, 2011, now U.S. Pat. No. 8,760,514, each of which is incorporated herein by reference.

BACKGROUND OF THE INVENTION

The present application has subject matter in common with the inventor's U.S. patent application Ser. No. 13/295,301, filed Nov. 14, 2011, which discloses a device having built-in digital data means and powered by a power source for a lamp holder; Ser. No. 13/296,508, filed Nov. 15, 2011, which is directed to a device having built-in digital data means and powered by a power source for an LED Bulb (now U.S. Pat. No. 8,562,158); Ser. No. 11/806,285, filed Apr. 30, 2007, discloses an LED night light having multiple functions; and Ser. No. 12/951,501 (now U.S. Pat. No. 9,033,569) discloses a lamp holder having a built-in LED light.

This application also has subject matter in common with the inventor's U.S. Patent Appl. Ser. Nos.

Ser. Nos. 12/292,153, 12/232,505, 12/232,035, 12/149,963, 12/149,964, 12/073,095, 12/007,076, 12/003,691, 12/003,809, 11/806,711, 11/806,285, 11/806,284, 11/527,628, 11/527,629, 11/498,874, 12/545,992, 12/806,711, 12/806,285, 12/566,322, 12/527,628, 12/527,629, 12/527,631, 12/502,661, 11/498,881, 11/184,771, 11/152,063, 11/094,215, 11/092,742, 11/092,741, 11/094,215, 11/094,155, 10/954,189, 10/902,123, 10/883,719, 10/883,747, 10/341,519, 12/292,580, 12/710,918, 12/624,621, 12/622,000, 12/318,471, 12/318,470, 12/318,473, 12/292,153, 12/710,561, 12/710,918, 12/711,456, 12/771,003, and 12/951,501.

The current invention involves an LED light, which may be in the form of a night light, bulb, lamp holder, or other light source or LED illumination device, and which has built-in digital device(s) or called camera-assembly with digital data recording, storage, wireless communication, and/or display functions for digital sound, messages, photos, movies, films, audio, video, etc.

Current home security products available in the marketplace, and especially wireless home security products from security company installation type, are very expensive and last from house purchase till house sold out. Furthermore, not only are they too costly, they are also too much trouble to install for DIY type (some may need an engineer to help install) and some applications need to use an outside control box with complicated settings, which are not easily for youth or aged people. Also, the batteries or power storage means of the current products must be replaced very often.

To solve the problem of frequent battery or storage means replacement, the current invention utilizes a power source provided by an alternating current (AC) electrical outlet into which built-in prong means are plugged or to which a screw-in base is connected or wired or AC-plug wire, and which can include circuit for converting the AC power to direct current (DC) power.

In addition, the current invention incorporates a low cost, super compact Digital Video (DV) device (DV) or same function products available in the marketplace, such as a webcam or driving cam or GoPro™, which is built-into the light device. Preferably, the camera has a head with tiny size like a hidden-camera so that it can be built into the light device and avoid detection by an intruder while solving the problems of high cost and difficult installation, eliminating the need to hire professional engineers at high cost per hour and saving wasted time in waiting for an installation appointment and trying to understand complicated setting procedures. The current invention can transmit digital data from the digital camera to the display unit while receiving power directly from the built-in prong means in the DV camera or from a screw-in base or other conductive elements connected with an AC power source via circuit means to provide DC power.

The current invention can also have the following features:

(1) The invention may provide a low-cost DV or camera-assembly device having a camera and display screen in one unit so that there is no need to spend extra for transmission by wireless means, thus providing the most economical model for a variety of low-income persons. All digital data obtained by the camera can be stored within a memory unit such as cloud storage station (FIG. 13 A4), or an SD or Micro-SD card and the images can be displayed when the memory unit is taken out and connected with display software.

(2) A preferred updated model can use APP (FIG. 13 4-5 (K)) or other such as Bluetooth to download digital data stored inside a memory unit such as an SD card or Micro-SD card or other data storage kits.

(3) The current invention also can use WiFi or other wireless kits to provide communications for a built-in camera or storage unit, or email or telephony to transmit the digital data to desired consumer, computer, or communication devices including a phone, laptop, display screen, etc., for high-end products that people are willing to pay for. In all of these applications, selected parts including a camera, storage units, Bluetooth, wireless transmitter, SIM card, circuit, controller, motion sensor, camera, webcam, driving-cam, IP-cam may be replaced by parts with equivalent function without departing from the scope of the current invention.

Functions of the current invention may include the following:

(1) digital data storage into a cloud storage station (FIG. 13 A4), or memory card, SD card, or Micro SD card, and retrieval of the data to a display device;

(2) digital data download by APP (FIG. 13 4-5 (K)) or other such as Bluetooth communication into a communication device(s), phone, computer, display device, laptop, or monitor; and (3) use of a wireless communication assembly to send out a message, data, alert, words, sound, and/or image to a variety of communication devices including a mobile phone, computer, or monitor, for example through a wireless network such as a 3G, 4G, or updated wireless network, WIFI network, router, or other equivalent wireless network.

Because the DV or camera is built into the light device, and may include an LED light, LED bulb, lamp holder, or other light source or LED illumination device, the invention offers excellent home security for low-end, middle-end, and high-end applications with simple installation. One advantage is that a bad man cannot easily find the preferred hidden-installation of the DV or camera from among a variety of lighting related device(s) such as lamp holders, LED bulbs or light devices on the wall or ceiling, even while the bad man's behavior is being detected and recorded inside the built-in DV or camera and storage unit, so this will offer the best safety record to protect home and family at any time.

The storage unit's inside digital data can use an cloud storage station (FIG. 13 A4), or SD or Micro-SD card to connect with downloaded from internet the said APP (FIG. 13 4-5 (K)) with display software, or incorporate Bluetooth communication to download the storage unit's digital data; and/or incorporate WiFi or a router's wireless communications to transmit to a digital device such as a phone, computer, laptop, display, monitor, etc. However that is appreciated that electric components, circuitry, cloud storage station (FIG. 13 A4), Bluetooth, WiFi, router, and downloaded from internet the said APP (FIG. 13 4-5 (K)) related communication parts and accessories built-into the light device, LED bulb, lamp holder or lamp socket adaptor may be varied without departing from the scope of the current invention.

In a preferred embodiment of the current invention, the DV or camera can include an endless recording that overwrites past digital data so that it will always update new data without the need to change any storage means, so long as the initial installation is selected for certain hours of recording and certain minutes for the storage section or unlimited storage capacity of cloud.

The preferred DV or camera-assembly device may have the most advanced technical features and functions available from the marketplace, which may include any combination of a (F1) wide angle or telescope lens assembly and fine pixel/HD (1280.times 720 pixel)/VGA (720 times 480 pixels)/good display screen (320 times 240 pixels) with light weight, rechargeable batteries, and anywhere from 1.3M up to 12M or more pixels to provide VGS or HD video or ISO selection;
(F2) auto focus/tilt/rotating/moving/scan functions;
(F3) a motion sensor by PIR, or, moving detectors (FIG. 13 2-3);
(F4) a motion sensor or-and comparison-software by screen detection;
(F5) a night vision selection (IR or equivalent);
(F6) auto power shut-off;
(F7) power saving;
(F8) a built-in screen;
(F9) USB means for data delivery;
(F10) remote control means;
(F11) wireless data transfer to a remote cellular home/computer/communication device(s) including remote controller, Bluetooth, WiFi, router, wireless transmitter and receiver device or wireless communication including WiFi, 3G, 4G or future generation wireless equipment, the wireless communication including mutual ends communication, software setting, hardware or software communication;
(F12) auto dialing or sending emails or texts to a police station;
(F13) auto tracking of moving object(s) from ants to elephants or other live objects;
(F14) other light means/device(s);
(F15) other wireless/remote/IR sensor/PIR sensor/motor(s) features;
(F16) any other electric or mechanical functions available from the marketplace for a digital camera or digital video recorder. Any or all such features may be selected and incorporated with the preferred DV or camera-assembly device to make sure people can see, know, and watch the desired site/events at any location/place/time.

The DV or camera-assembly device may have a plurality of cameras to provide multiple images that can be shown on a screen so as to monitor multiple areas. It will also be appreciated that the DV or camera-assembly device can incorporate an IC chip and related circuitry, motor-means, and a motion-sensor with more than one sensor head to allow a single camera head with auto tracking functions to follow moving objects.

A preferred embodiment of the built-in DV or camera-assembly device of the current invention includes an LED bulb and lamp holder or a variety of lighting devices to provide an LED light device, night light, or security light which has prong-means, socket-means, or conductive wires to connect to an unlimited power source or large capacity energy storage unit which directly supplies current, or to a rechargeable large capacity power storage-means such as a rechargeable battery, and which also may incorporate any other separate means such as a wire(s), adaptor(s), or transformer(s) to deliver electricity from the unlimited power or large capacity electricity storage unit to the LED device and built-in digital data device.

Furthermore, the unlimited power source (outdoor application) or large capacity electricity storage unit (indoor battery operated application) may use prong means, a socket base lamp holder, and conductive means, or a USB-cable that directly comes out of the device housing, or a regular 120 Volt 60 Hz plug wire that directly comes out of the device housing and connects with the public electricity system for home, house, and public areas. The electricity delivery to the device from an AC or DC power source may use any conventional skill, method, and kits.

One of the best applications for the current invention is as a webcam that is already used for all kinds of computer, laptop, phone, or communication equipment, or as a driving-cam already used for all moving vehicles. Both are inexpensive. Another similar application is a police department traffic-cam and it simple just has wifi or sim card or share the hot-spot so can instantly to connect with cloud and APP with software as FIG. 13 show all desired selected combination(s).

Conventional webcams are limited in that they cannot follow moving people or objects, so people have to sit in front of the webcam to talk with people. Furthermore, the conventional webcam lacks brightness during nighttime and so cannot take good and colorful photos in a dark or nighttime environment.

On the other hand, conventional security lights such as the Heath Zenith® motion sensor LED or PAR38 or halogen bulb for outdoor security lights or Mr.Beam® battery operated security light lack a camera, storage unit or connect with cloud storage station, memory card, Bluetooth, WIFI, or router communication with owner of phone downloaded APP with software and therefore are incapable of colorful photo, image, sound, or movement recording and replay functions, and therefore do not provide people with good security by preventing bad men from doing bad things.

The current invention modifies the above-described motion sensor products such as the motion sensor lamp holder by, as shown in FIGS. 1A, 1B, 1C, 2A, and 2B, adding a DV or camera-assembly and memory card, which will add only limited cost but transform the motion sensor security products into different function light device such as the ones disclosure in the current inventor's U.S. Pat. Nos. 8,562,158, 9,010,986, 9,010,986. The added DV or camera-assembly and cloud storage station and download APP or memory card with optional different combinations of Bluetooth, WIFI, or router for transmitting or receiving kits built-into light related products including an LED bulb, lamp holder, lamp holder adaptor, or other light device offers the brightness for dark or nighttime illumination that allows the DV, webcam, or IP cam, or driving cam to have sufficient brightness to take full color photos and clear video for storage in the cloud storage station or memory card or memory unit. This also overcomes the disadvantage of some night vision designs that use IR or photo diodes to make up for dim or dark brightness, in that such designs normally can only take black and white photos or video and do not provide clear photos or images. Adding the DV or camera-assembly and related parts and accessories as discussed above is the best combination to replace the IR night vision design. This is a main reason why the current invention prefers to incorporate an existing light device with a built-in camera, memory unit, and optional wireless communication device to achieve desired functions and cost.

Other problems with IR night vision are that it is not suitable for use with existing light devices to enable photos or video to be taken in a dark environment, has high power consumption and heat output, the distance is too short, and IR night vision is expensive.

In contrast, adding a camera and wireless-system to connect with Cloud or memory units into existing light devices has no such issues. To add a camera and wireless-system or-and memory unit and optional wireless transmitting and receiving kits is the best combination, eliminating the need to provide a new security camera with connecting to Cloud or memory unit with optional wireless device. The majority of houses, homes, and public buildings already have all kinds of existing lighting devices that can be replaced with light device having a camera with connecting to Cloud or-and memory unit, including an outdoor motion sensor security light, door entry motion sensor light, motion sensor night lit, and other motion sensor light, any of which can be plugged into an outlet, be powered by a battery, wired, or connected to an outside transformer, outside adaptor, or other power storage unit to supply sufficient or unlimited power to the light device.

The current invention may be applied to an LED bulb as shown in FIGS. 3A, 3B, 3C and FIG. 4A, 4B, 4C. The LED bulb may be a conventional-type LED bulb with a built-in camera and wireless-system to connect with Cloud or memory unit and optional wireless communication kit incorporate with people downloaded APP with software. The preferred camera has a tiny diameter lens so it can become a "hidden camera" or so-called "pin-hole" camera so as not to be easily found by a bad man while invading a home, house, or building to do bad things.

The same is true for applications such as a lamp holder, lamp holder adaptor, and other kinds of lighting. The preferred camera is a hidden-camera or pin-hole camera so as not to let people easily find the location of the security camera and destroy it.

FIGS. 8A and 8B show a portable flashlight having built-in DV or camera-assembly, memory unit, and optional wireless communication such as WiFi, 3G or 4G or future wireless transmitter or receiving kit to offer a police, army, military, or security person a super bright light source to take colorful photos, take video, or offer on-line images through the optional wireless communication so that viewers can see the recorded, on-line, or on-air instant live images and ensure the safety and status of the persons using the flash light. When used for army or military purposes, the DV or camera can incorporate (1) a visible flash light beam to offer brightness or (2) an invisible IR or photo diode beam to show the surrounding status and not let the enemy see the visible light beam and shoot the army or military team and persons.

The flashlight offers super good brightness to let the DV, camera, IP cam, driving cam or webcam take nice photos, video, or on-line messages with colorful image, in the same manner as the other lighting device discussed above. The portable flashing light or wearable flashlight allows people to report or send out images by wireless communication equipment to a phone, computer, screen, or communication equipment in a dark or evening environment. The power can be a DC power source, rechargeable power source, or wireless recharge power source that uses market-available charging or battery storage units with sufficiently large capacity.

The current invention provides a light device having a communication assembly which can have multiple communication functions when incorporating related or updateable software such as an app downloaded by owner of phone or computer and to make comparison or analysis or give instruction back to said light device by wireless-system. The functions may include the ability to: (a) talk through the security light; (b) control of the camera angle, position, focus, orientation, setting, and adjustment details; (c) send out email, alerts, words, speech, and chat, dial to a police station, or connect with a government utility service though an existing WiFi, router, Internet, wireless network, 3G or 4G or future wireless network so as to check all areas or locations for status at any time though the wireless communication assembly, kit, or device built into on the security light to communicate all digital data.

All non-camera motion sensor lights can be upgraded to a built-in camera(s) motion sensor security light while replacing the built-in camera motion sensor unit or camera-assembly to the simple motion-sensor without camera or-and wireless-system, so that a consumer can upgrade the motion sensor to have a built-in camera at lower cost and increase the safety of the home, house, office, or environment space. People can then hang or put a sign or sticker on the front of the house (Smile, a hidden video is recording now!) to get the bad guys away from the residential house or office or business areas.

The current invention combines the inexpensive and compact webcam, DV, or driving cam or camera-assembly with a light device to solve all of the above-listed issues, and particularly a lack of brightness to take good photos in a dark environment, and can further add a wireless-system to connect with Cloud, or memory means, power storage unit, wireless transmitter and receiver, Bluetooth, WIFI, router, give instruction back to light device by owner downloaded APP or computer with software, and motion sensor.

Also, an embodiment of the current invention can provide a USB-cabled light device with a camera head having an auto tracking assembly, which will make an excellent auto-tracking webcam to let people freely move while talking with other parties and has all preferred camera-assembly, wireless-connection functions discussed above.

Another preferred feature is to include foldable or retractable prongs so that the device can be carried anywhere, like night light or night light USB charger products having a built-in hidden camera assembly with optional LED motion sensor or adjustable angle motion sensor of night light. The current invention may have different constructions that provide an LED night light with a built-in digital data device capable of being moved and used anywhere, including on a car, motorcycle, boat, bus, truck, or other transportation equipment so long as the foldable or push-in/push-out prong-means is incorporated with a proper receiving-means and adaptor-means to connect with a transportation cigarette lighter or USB-port device.

Furthermore, the DV or camera may have a variety of parts and accessories to get desired functions. The DV device or camera-assembly parts and accessories may be selected from different camera heads, kits, lenses, optics means, lens assemblies, night vision means, means for detecting motion by a n image of screen or motion sensor, vibration sensors, sound sensors, storage means, SD cards, Micro-SD cards, memory sticks, memory means, operation functions, power saving circuits, screen touch panels, exposure means, and/or motor means, as well as means for adjusting or selecting clearance, pixels, sharpness, ASA, and so forth.

Another preferred embodiment of the DV device or camera-assembly adds to a lamp holder or LED bulb. A majority of light source lights and lamp holders are installed at a position which is higher than people's height, so that they will easily record moving objects without any objects blocking the camera shooting directions. Furthermore, the current invention not only can provide an LED bulb or lamp holder with a DV or camera-assembly, but also for all kinds of other market available light devices including a night light that incorporates a wider angle camera lens so that it can look for moving objects from an unnoticeable position. The current invention also can apply more than one camera head with a divided image on screen to save cost or use only one camera head that incorporates screen-comparison functions, or more than one sensor-means and an IC circuit to calculate a position or orientation difference, and to delivery electric signals to a motor-means to move the camera head toward a moving object and thereby provide an auto tracking camera. Still further, any equivalent or same function device will still fall within the current invention and can be added to the preferred DV devices or camera-assembly to provide nice, clear digital data and storage into a Cloud or memory-means powered by an unlimited or big power source without causing worry about battery power or bad electric wire installation, unlike the conventional home security equipment.

In embodiments involving a lamp holder, insert means may be provided to connect with an original lamp holder's receiving means to change the lamp holder's current, functions, current type, voltage, and features, such as changing from AC to DC at a certain voltage and amperage, adding cameras and related parts and accessories, adding LED device current triggers, adding IC chips to operate desired functions, adding a tracking motor device, adding a sensor(s), adding remote control parts and accessories, adding an infrared nighttime vision function, adding memory means with related parts and accessories, adding display means, adding transmitter means to transfer digital data to a remote distance, adding an auto dialing system, and adding an Internet connect function, or any other electric or mechanical functions based on market requirements.

The lamp holder may be selected from market-available items, and may hold one or more light means, including any of an incandescent, fluorescent tube, PL, CFL or LED light for use with a variety of different bases, which may be in the form of a screw base, bayonet base, two pin base, twist base, or push and twist base. The lamp holder is connected with the unlimited or-and backup rechargeable (As FIG. 12-B) power source when the lamp holder's insert means is connected with the original lamp holder receiving means so that the power can be obtained from the original lamp holder's unlimited power source or recharge inside backup rechargeable battery while light turn on at night time, and while the light turn off or power fail or power shortage the recharge backup battery supply power for sensor or-and camera-assembly.

The camera means is incorporated with the lamp holder of this embodiment, like the camera means of any of other embodiment, an can consist of desired parts and accessories including lenses, optics means, electric means, mechanical means, circuit means, integrated circuit (IC) means, data delivery means, data storage means, USB means, cable means, microphone means, record means, display means, sensor means, PIR means, IR means, night vision means, flash means, switch means, motion detect means, sound detect means, photo sensor means, motor means, tracking means or other market available parts and accessories to allow people to get a digital image, video, and audio data and record it in Cloud or memory means or send/transmit the data to a communication device, computer device, receiver device, and/or display device to provide predetermined functions, effects, and performance.

According to another preferred embodiment, an LED bulb means includes a plurality of LED-units or LED dice, LED chip, or COB (Chip on Board) that fit within a bulb housing having an appropriate shape and dimensions, and positive and negative electric contacts to get power from the power source when the electric-contacts connect with the power source and the power source is thereby connected with the desired electric parts and accessories, which may include circuit means, IC means, conductive means, switch means, sensor means, remote control means, IR means or other electric or mechanical means to cause the LED-unit(s) and the camera means to be activated with the LED bulb and its added parts and accessories to display the above-mentioned pre-determined function(s) and performance(s).

The LED bulb has space to install the camera means on its housing as well as any of the following: joint-means, rotating means, connect-means, spin-means, catch-means, a gear-set, a motor set, control means, IC means, sensor head(s), a tracking assembly, memory assembly means, display means, screen means, USB means, conductive means, digital data delivery means, battery means, rechargeable battery means, power fail means, or other means to allow the camera means built-into the LED bulb to have desired functions, features, and performance.

The space in the LED bulb may include a pole(s), block(s), piece(s), and/or compartment(s) having properties that cause the bulb or space to be extendable, retractable, foldable, rotatable, and/or transformable so that the related parts and accessories can be installed within.

The camera means may be turned-on and turned-off by sensor means, a PIR sensor head, moving detector hardware or software, more than one sensor head(s), remote control means, switch means, motion detection means, vibration detection means, heat sensor means, and/or smoke detector means, so as to take photos, video, and audio and provide colorful, clear, and sharp digital data to be saved in cloud, storage means, shown on a screen for selected-screen areas comparison or operation, shown on a wireless screen, shown on a monitor(s), or transmitted to a communication device, computer device, Internet device, or auto dialing device and incorporate with owner of phone or computer downloaded APP with software to send back to light device has built-in camera or camera-assembly.

The LED-units, camera means, sensor means, remote control means, moving LEDs, moving sensor means, moving camera means, motion detection means, heat detection means, smoke detector means, motor means, auto tracking assembly, and so forth can be installed on a fixed housing, moving or angle adjustable housing, or extendable housing, so as to provide a desired sensor range, distance, and angle with a variety of selection options for the camera's pixels, focus range, and/or pictures per second, for video/movie and sound/audio upon activation of the camera means to shoot and store the digital data into the Cloud, or memory means, communication device, computer device, consumer electric device, screen, or monitor(s).

Finally, the light device having a built-in camera, memory kit, and optional wireless communication device may take the form of any of a variety of other light devices selected from market available light devices such as a flashlight, night light, desk lamp, floor lamp, down light, ceiling light, track light, security light, projection light, outdoor light, indoor light, LED light fixture, LED light bar, LED picture light, LED closet light, LED door light, LED garage light, LED motion sensor light, LED power failure light, LED motion sensor with auto tracking means, LED patio light, or any other LED light device available from the marketplace.

BRIEF DESCRIPTION OF THE DRAWINGS

FIGS. 3A, 3B, 3C, 4A, 4B, and 4C show a third embodiment of the current invention in the form of an LED bulb having a built-in DV or camera-assembly, wireless-system to connect cloud, or, memory cards and optional wireless communication device(s), the LED bulb also having extendable, rotatable, bendable, or other equivalent features on front or rear body to move the DV or camera-assembly away from a wall or ceiling blocking material or away from heat-producing parts so no need inner thermal or heat spreader.

FIGS. 12A, 12B, 12C, 12D, and 12E show a separate motion sensor-unit or camera-assembly having a built-in digital data device including at least a camera(s), as well as one or more digital data storage kits, camera-assembly, wireless-system to connect cloud, APP with software, or memory card, SD card, Micro SD card, IR motion module, Bluetooth module, wireless module, control module, photo sensor module, circuit and conductive wires, the camera(s) having a wide angle and hidden location to protect people's home, residence, office, or small business, with optional IR night vision optics kits to help people take photos in a low or no brightness environment or a light source with brighter lights to take more colorful and clearer photos or video in the lower or no-brightness environment.

FIGS. 12F, 12G, 12H, 12I, 12J, and 12K show some of the current invention's preferred models to upgrade the current market-available non-camera motion sensor security light which has different light sources, construction, number of light units, shape, brightness, sensor range, and sensor distance for a built-in motion sensor or separate motion sensor, or separate wireless motion sensor unit, with or without the IR night vision to become the current invention LED light device has built-in camera and comprising wireless-system to connect with Cloud, APP with software, wifi or wifi-extend through 3/4/5G internet or other network to transmitting out and receiving operator's phone or computer APP, software or pre-program instruction back to the LED light device.

FIG. 13 is a preferred function chart for light devices having different power sources and a built-in sensor selected from a motion sensor, moving sensor, photo sensor, vibration sensor, sound sensor or other market-available sensors with IC chip and circuit(s) to carry out one or more of functions (4-1) to (4-8) using a car driving cam or body cam such as a Sony camera or video camera, GoPro, drive-cam, IP cam, or outdoor security camera with optional features such as facial recognition and identification, walking recognition and identification, and other human body recognition and identification functions with a wired, wireless, Internet, or WiFi transmitting and receiving device to let people receive digital data, messages, photos, images, sound or talk for multiple parties to protect people's houses, offices, warehouses, residences, and other locations with the best security and wireless controller, app controller, or Z-wave controller for all equipment, devices, home appliances under predetermined programming and control.

FIG. 14 shows a motion sensor head PIR that uses digital data to replace analog data so as to save a lot of electric parts and accessories, bonding, and soldering, and that includes one or more of an IC, diode, resistor, capacitor, and/or transistor to change from analog data or signals to digital data or signals and avoid electric signal interference and avoid false functions or operation.

DETAILED DESCRIPTION OF THE PREFERRED EMBODIMENTS

Figure 7A:
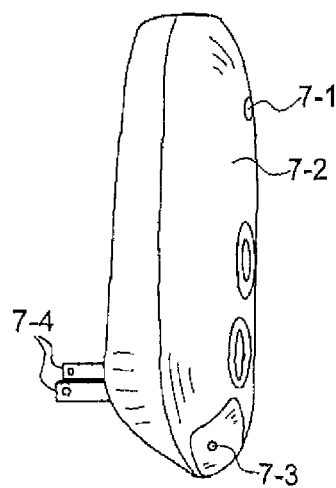
FIGS. 7A, 7B, 7C, and 7D show another embodiment of the current invention in the form of a light device having built-in digital data means and powered by an AC power source from prongs inserted into outlets from wall or extension cords with a driving cam, web cam or other market camera-available camera such as an optional low-light camera which can capture images in an almost no light condition.
Figure 7B:
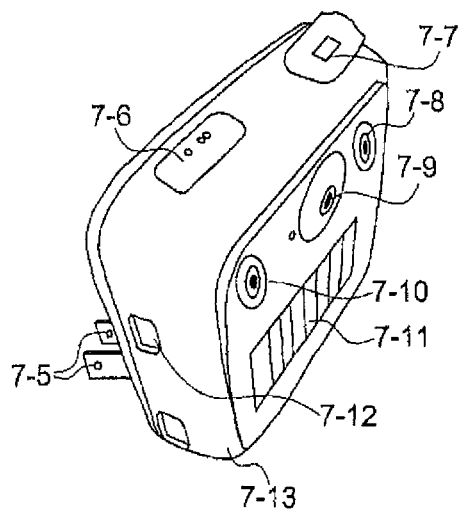
Figure 7C:
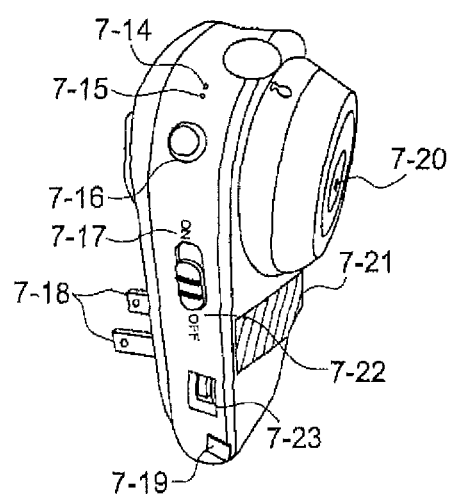
Figure 7D:
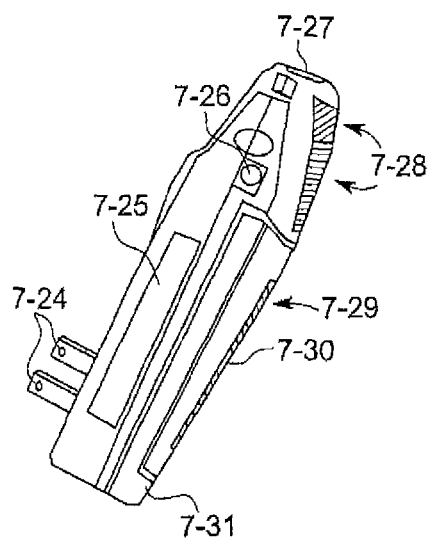
Figure 8A:
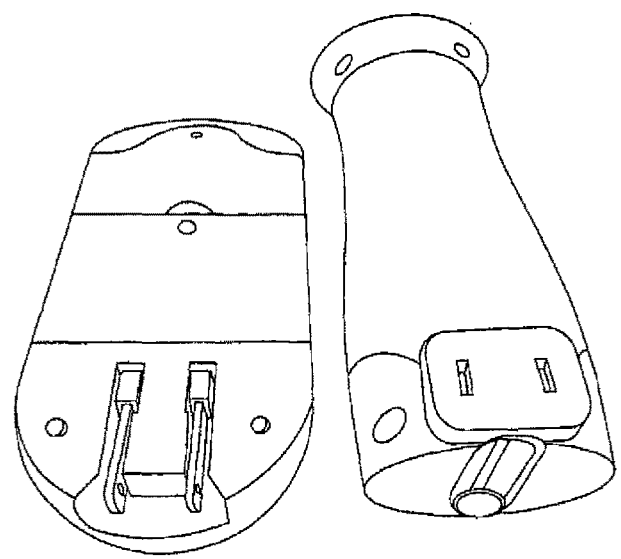
FIGS. 8A and 8B show a foldable or retractable prong means construction and details for a flashlight device which has a built-in DV, memory cards and optional wireless communication device(s) for security or military or army or police to use with different materials and carry design so that the flashlight can easily be held, carried, or attached on a pocket, helmet, waist or weapon, and having built-in digital data means and powered by an AC power source from prongs inserted into outlets from wall or extension cords with a driving cam, web cam or other camera such as an optional low-light camera.
Figure 8B:
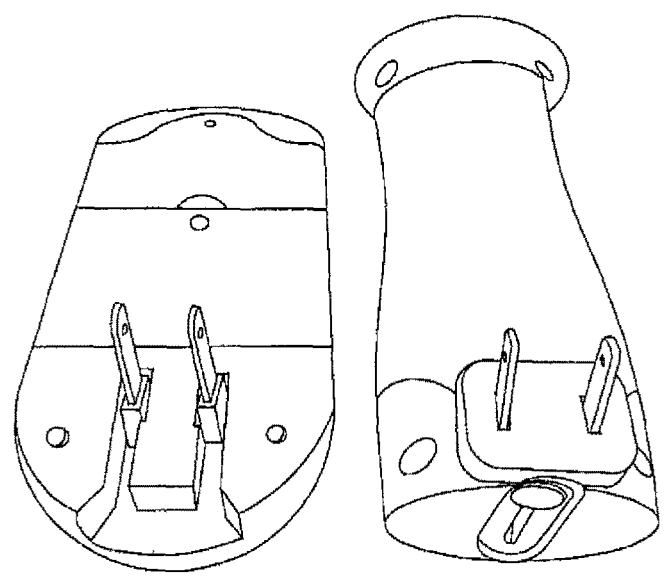

The invention is a device having digital data means that is powered by an AC unlimited or DC large capacity electricity storage unit power source and built-into a lamp holder as shown in FIGS. 1A, 1B, 1C, 2A, and 2B), an LED bulb as shown in FIGS. 3A, 3B, 3C, 3D, 3E) 4A, 4B, 4C, 6A, 6B, 6C, and 6D), or light device as shown in FIGS. 5A, 5B, 5C, 5D, 7A, 7B, 7C, 7D, 9A, 9B, 9C, 9D, 9E, 9F, 10A, 10B, 11A, and 11B), or flashlight as shown in FIG. 8A and FIG. 8B.

Figure 1A:
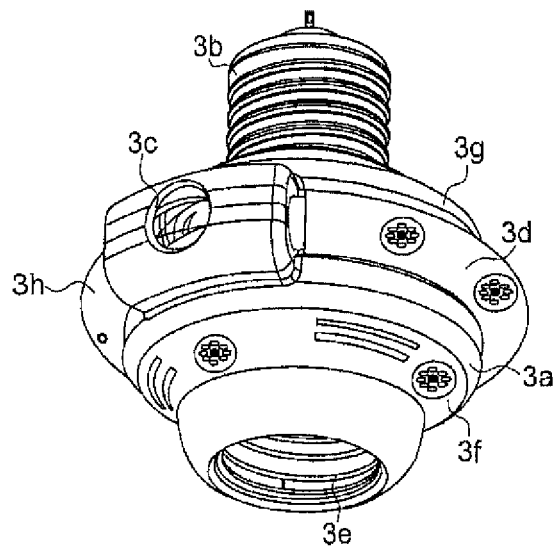
FIGS. 1A, 1B, and 1C show a lamp holder according to a first preferred embodiment of the current invention having a built-in DV or camera-assembly, wireless-system to connect cloud, or memory cards and optional wireless communication device(s).
Figure 1B:
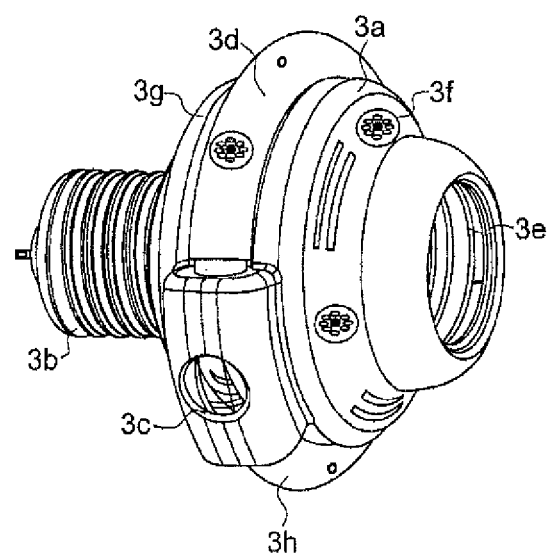
Figure 1C:
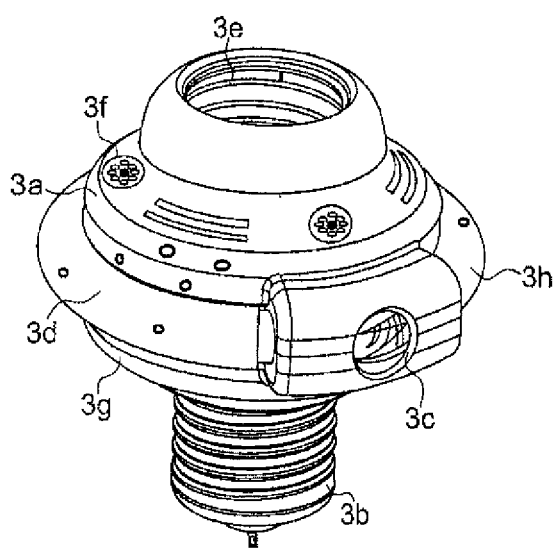

FIGS. 1A-1C show a device in the form of a light fixture insert (3d) with a screw-in base (3b) and a built-in camera head (3f) that can be screwed into an existing light fixture to add digital camera or camera-assembly functions, with power being supplied through an elastic terminal at the top of the light fixture insert when the insert is screwed into the existing light fixture. The insert includes a socket (3e) into which a market available all kind of bulb may be screwed to receive power from an unlimited power source through the insert base (3b). A sensor (3c) and IC are provided to control movement of the camera. By replacing a conventional bulb in the existing light fixture with the illustrated insert (3d), a security camera can easily be installed without the need for expert installation. When the bulb is then screwed into the socket, the resulting installation will look like an ordinary light fixture and therefore bad guys will not notice the camera (which preferred is hidden or in the form of a pin-hole size camera). The camera can include night vision or infrared capabilities, and tracking features, and the insert may be waterproof to protect the camera and electronics. The bulb may be an incandescent bulb, or another type of bulb such as an LED bulb or CFL or any other light source bulb.

Figure 2A:
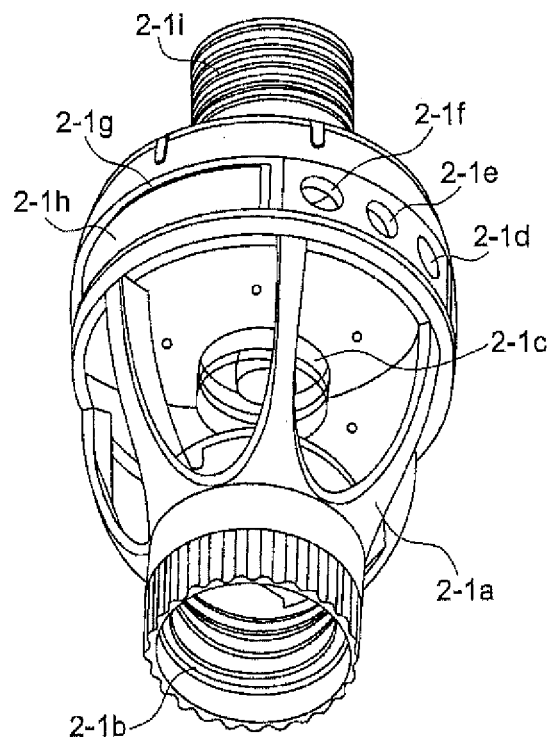
FIGS. 2A and 2B shows a lamp holder of a second preferred embodiment having a built-in DV or camera-assembly, wireless-system to connect cloud, or, memory cards and optional wireless communication device(s).
Figure 2B:
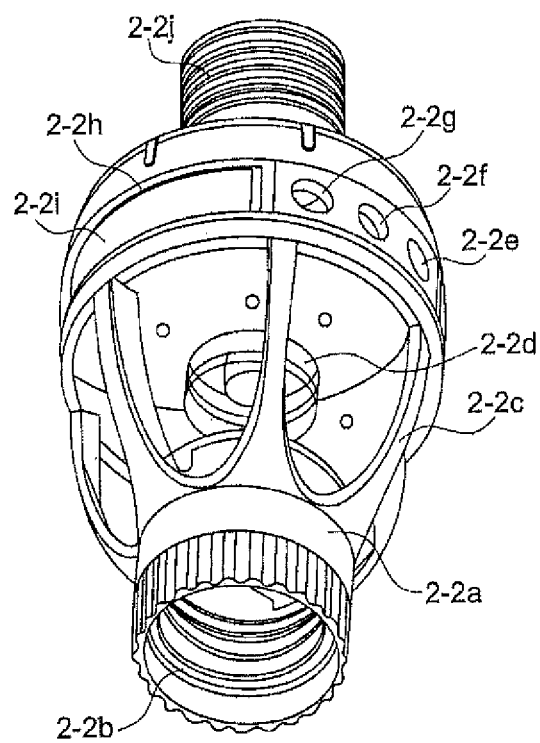
Figure 4C:
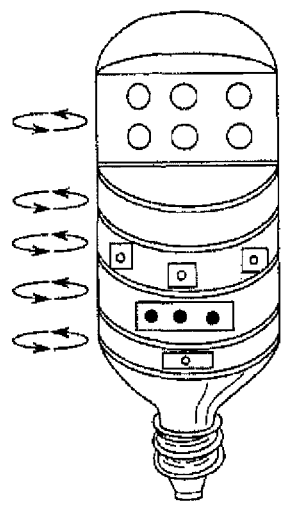
Figure 3D:
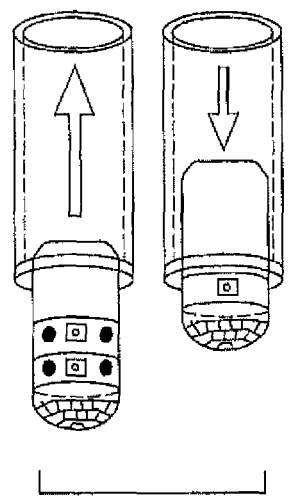
FIGS. 3D and 3E show a fourth preferred embodiment of the current invention, also in the form of an LED bulb having a built-in DV or camera-assembly, wireless-system to connect cloud, or, memory cards and optional wireless communication device(s).
Figure 3E:
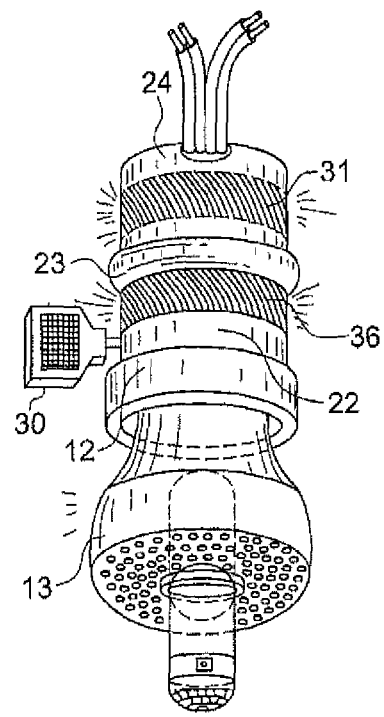
Figure 5A:
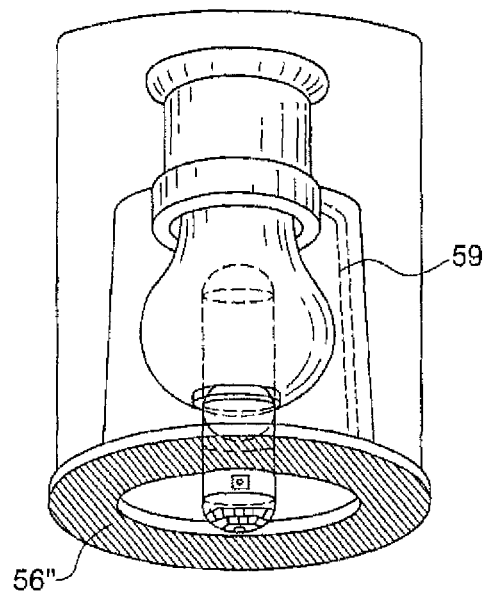
FIGS. 5A 5B, 5C, and 5D show another embodiment of the invention in the form of an LED bulb having a built-in DV or camera-assembly, wireless-system to connect cloud, or, memory cards and optional wireless communication device(s).
Figure 5B:
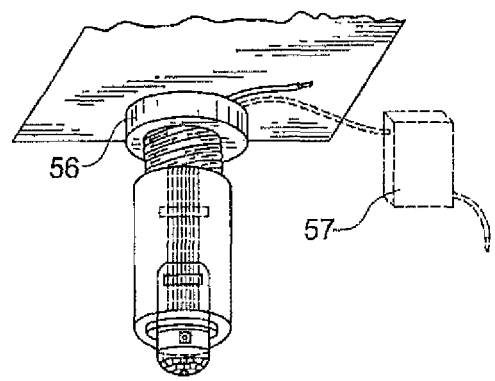
Figure 5C:
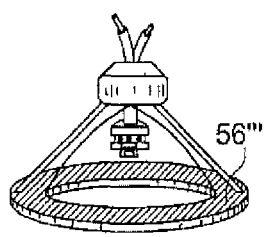
Figure 5D:
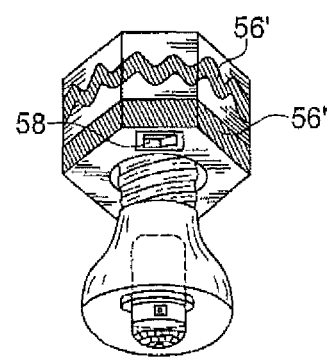
Figure 6A:
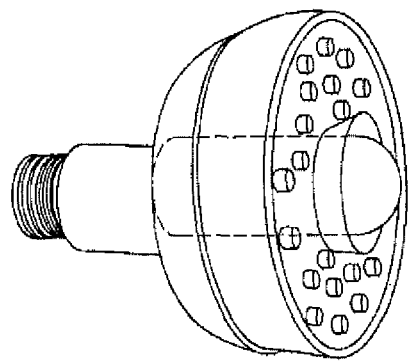
FIGS. 6A, 6B, 6C, 6D show a variety of different LED bulb designs which can have built-in digital data means normally powered by an AC power source and backup DC batteries to supply power during a power failure, including but not limited to a light source, LEDs, camera and digital data device parts and accessories, optionally incorporating a preferred camera-assembly or low-light beam condition camera that can capture high pixel images.
Figure 6B:
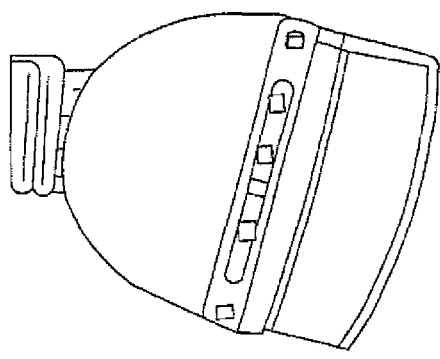
Figure 6C:
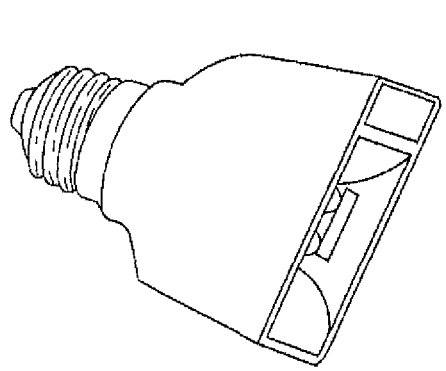
Figure 6D:
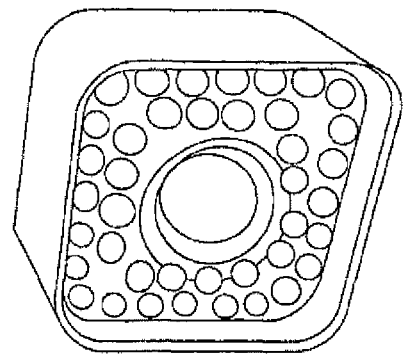

FIGS. 2A and 2B show an arrangement similar to that of FIGS. 1A-1C. In the arrangements of FIGS. 2A and 2B, like that of FIGS. 1A-1C, the camera preferably faces downward from a ceiling installation, and the motion sensor or sensor-assembly causes the camera to start recording in response to detection of motion in the field of view. As shown in FIGS. 3A-3C and 4A-4C, the sensors and/or camera can be extended or retracted and rotated to avoid interference by lamp shades, lamp covers, lamp walls, or other blocking means that otherwise might block a field of view of the camera or sensor. The device may have multiple rings, each of which is separately rotatable to enable separate rotation of the sensor(s) and difference camera heads, as shown in FIGS. 3A-3C and 4A-4C. As shown in FIG. 3D and FIGS. 5A-5D, the extension may enable the position, orientation, or angle of the sensor or camera head to be varied, or enable the sensor to be extended while the lighting feature is within a shade, and the device may further include external light elements such as lighting elements (31) and (36), as well as additional sensors such as sensor located inside the extendable tube. As shown in FIGS. 6A-6D, a variety of LED bulbs may be inserted into the light related device.

The preferred light device may have a built-in DV, memory kit, and optional wireless communication system. FIGS. 7A-7D show digital video webcam lighting devices with built-in prong means to connect the webcam directly to an unlimited AC power source such as a wall outlet, and sensors that can be used to provide auto tracking functions. It will be appreciated that the video webcam devices are conventional, except that they have been modified to include a lighting function, built-in prong means, and/or various night or emergency lighting features.

The Light device has built-in DV or camera device and memory kits or-and optional wireless communication system as FIGS. 7A, 7B, 7C, 7D show some of preferred built-in LED light device and built-in camera-assembly which has everything as above discussed to captured the colorful digital data by camera or DV has built-in LED lighting devices. From FIG. 7A can be a door bell LED light which has the camera (7-1) and has the one push button for trigger ring bell and system, other round can be a motion sensor or moving detectors inside which also can trigger the camera-system for desired pre-program functions and operate the desired following works.

These devices are shown on FIG. 7A to 7D with (1) built-in prong, or (2) built-into the wall connect by wired, or (3) built-in door powered by wired, or (4) install on outdoor anywhere powered by wired or AC plug-wire or transformer, or solar power by attachment means or other alternative place by attachment skill to connect an house electricity or energy storage power source to get AC or-and DC or-and power backup power source including a wall outlet or extension cord outlet, and also has built-in motion sensors or moving detector(s) or switch that can be used to provide control the light device and camera unit or-and auto tracking functions. It will be appreciated that the camera or DV devices include; (1) Lighting function and camera which can take at least MP4 images both can activate as pre-programmed such as (a) camera take photos or video always or every period of time during day time such as per second or minutes. (b) camera take photo or video while sensor(s) or detector(s) been triggered any time (d) camera take photo or video while light source turn on by switch at the night or under dark environment or inside store(s) (e) light device and camera activated by any pre-setting program. (2) The light device powered by the built-in prong or bulb-base or wired or outside transformer or solar-system, or backup batteries to get AC or DC or both power. (3) and/or various preferred function or features or operate more following works as above or the current invention discussed inside all text and below more details for all functions.

The multiple functions LED light has built-in DV or camera of FIG. 7A may include an LED (7-3) to serve as a night light or-and offer sufficient brightness for camera-system for a big size (whole front surface) illumination by inside plurality of LEDs or COB (Chip on board) (7-2) for camera device and a DV or camera device (inside of the one of 2 circle), or-and has pair of moving detectors/sensor (inside of the other 2 round circles) or-and motion sensor (inside of the other 2 round circles. The alternative arrangement for this housing can be the 2 circles one is push switch to trigger the ring bell and camera system. One of the 2 circuit is sensor device may is a motion sensor or moving detectors and the whole front surface is super brightness LED light to offer sufficient LED illumination while under dark environment to allow camera-assembly to take color digital data including audio data.

From FIG. 7B the DV or camera device of FIG. 7B includes foldable prong or wires or AC plug-wire or bulb-base (7-5) to insert to bulb-receiving socket to connect with power source, a plurality of LEDs in desired type (7-11) to offer sufficient brightness for camera-assembly to take a colorful digital data may including audio sound or communications or conversation, or a pair of LEDs work as night light or-and power fail light (7-12), a pair of moving detector sensor or moving sensor(s) is install within the opening (7-8), or a microphone and speaker install inside the circle areas (7-9), memory card slot (shown on other side of 7-13), multiple position switch or for section auto/on/off/setting switch (7-6), camera head (7-9), and USB ports or power input-end or other receiving-end (7-7) to deliver digital data or charge or the electricity or current inside the cover and hidden antenna (inside the unit) for as long as length to get strong wireless transmission capability, MCU or CPU or IC or other circuit inside the LED light device including software to allow consumer can use touch-panel of phone or computer device to select-areas for detecting moving people or objects and these hardware or software has capability to wireless transmitter or communication with Wi-Fi or Wi-Fi-extend and connect with 3G/4G/5G network assembly (not shown) to connect with cloud storage station and pre-program software or even AI software to do the following work as above discussed and wireless communication circuit inside the housing. The LED device can be any geometric shape with above discussed all parts including all kind of LED light, LED bulb, LED doorbell light, LED garden light, LED security light, LED flashlight, LED torch light, LED motion sensor light, LED motion sensor light, LED Motion or moving detector light device as above discussed.

From FIG. 7C the LED light device is a multiple functions LED light device has optional project image features from top project image output-end with foldable prong or wired or AC Plug-wire or bulb-base (7-18) to get AC power source, has multiple-position slide or push-on switch including auto/on-off/selection/power/photo/video, and has super bright LED light source (7-21) to offer sufficient brightness for camera-device (7-20) has optional zoom in and zoom out focus adjustable camera-device to take a color photos under dark environment where the location also can install the motion sensor or moving detectors (7-21) inside the areas but separate with plurality of LED light source to prevent from interference from light beam to sensor or moving detectors, or optional including LED indicator lighted switch (7-17), microphone and speaker (7-16), indicator LEDs (7-14) and touch switch or inductive switch (7-15), one or more camera-device (7-20) has focus adjustable head(s) on center and plurality number of SMD LEDs or COB (Chip on Board) LED (7-21) light on ring or inside the window to offer flashlight or brightness illumination (7-20), motion sensor with Fresnel in flat or round or dome shape install on the front face of LED light device and inside has photo/shock/smoke/flood sensor or has pair of window to install for a pair of moving detectors sensor (7-21), USB port or solar power source input-end or audio data input-end or charge-input end, transformer input-end (7-23) for digital data or electricity or audio or power delivery or other adaptor (7-23), and micro SD card slot (7-19), and had all MCU or CPU or IC or selected circuit or module for wireless, Wi-Fi, cloud communication system built-into inside of the LED light device housing (7-14) in any geometric shape with power source connector selected from prong, bulb-base, wires, AC plug-wire.

From FIG. 7D the LED light device is a multiple functions LED light device can be one of night/power fail/motion or moving detector light, security light, LED entrance door light, LED doorbell light, LED bulb with or without a built-in displayer or screen light function, including foldable prong or bulb-base or wire, or AC plug wire, outside transformer power source (7-24), a memory card or wireless to storage digital data to cloud by wireless connecting system such as Wi-Fi, Wi-Fi extend, APP, software, or-and USB adaptor compartment or-and back-up battery (7-25), an audio assembly including speaker and microphone or and doorbell sound chip and wireless communication for deliver the audio (7-26), a swivel or rotatable or focus adjustable camera head in center and has plurality of LED(s) on ring or donut circle (7-27), an motion or moving detectors sensor or other type sensor(s) fit within or behind the motion sensor Fresnel lens (7-28), an electroluminescent or LED light for big area illumination (7-29), an hidden antenna compartment (7-30), and a foldable compartment for a screen or displayer (7-30), the other sides of the LED light device has parts & accessories select from power/model selection/setting/Auto for power fail function/All Off switch which has multiple sections. All circuits, IC, electric parts & accessories, all kind transmitter or receiver for Wi-Fi, 3G/4G/5G network, satellite channel, connect cloud digital data storage station, MP4 format creating circuits, etc. all fit within the housing.

The webcam device of FIG. 7A may include an LED (7-1) to serve as a night light as well as a webcam, while the webcam device of FIG. 7B includes foldable prong means (7-5), a power fail light (7-10) as well as a night light (7-11), switch (7-12), memory card slot (7-13), on/off switch (7-6), camera head (7-9), and USB adaptor (7-7).

The device of FIG. 7C is a projection night light with foldable prong means (7-18), power switch (7-17), photo/video switch (7-16), indicator LEDs (7-14) and (7-15), camera head (7-20), night light (7-21), power switch (7-22), USB adaptor (7-23), and LED floor light (7-19).

The device of FIG. 7D is a LED night light with a built-in emergency light function, including foldable prong means (7-24), a memory card and USB adaptor compartment (7-25), a power input (7-26), a camera head (7-27), an LED night light with emergency light function (7-28), an electroluminescent or LED night light area (7-29), a battery compartment (7-30), and a foldable compartment (7-31) for a screen select switch, model selection switch, and setting switch.

The portable flashlight has a built-in DV, memory unit, and optional wireless communication such as WiFi, 3G or 4G or future wireless transmitter or receiving kits to provide a police, army, military, or security person with a super bright light source to take photos, take video, or offer on-line images through the optional wireless communication so that viewers can see the recorded, on-line, or on-air instant live image and make sure of their safety and status. For army or military purposes, the DV or camera can incorporate, for nighttime or dark environments, (1) a visible flash light beam to offer brightness, or (2) invisible IR or a photo diode to show the surrounding status without letting an enemy see the visible light beam and shoot the army or military team and persons.

The flashlight offers super good brightness to let the DV, camera, IP cam, driving cam, or webcam take nice photos, video, or on-line messages with colorful images.

As with the other lighting devices described above, the portable or wearable flashlight can allow people to report or send out images by wireless communication equipment to a phone, computer, screen, or communication equipment to report the people's status or environment in a dark or evening environment. This is unique and the power can be a DC power source, rechargeable power source, or wireless recharge power source using market-available charging or battery storage units with sufficiently large capacity.

Figure 9A:
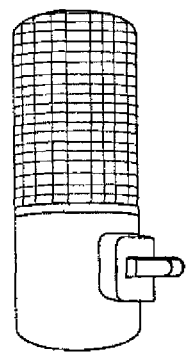
FIGS. 9A, 9B, 9C, 9D, 9E, and 9F illustrate a size comparison for a traditional LED or LED motion night light versus a plurality of market-available digital video camera units having all kinds of light sources or night-vision devices and powered by AC power via prong means or DC power during a power failure and those add the current inventions features become built-in LED light source and camera-assembly has wireless-system to operate camera captured colorful digital data.
Figure 9B:
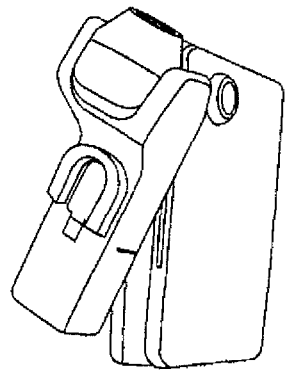
Figure 9C:
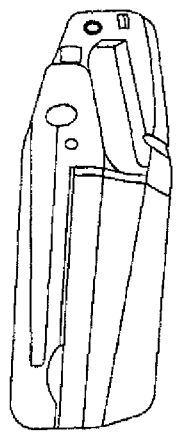
Figure 9D:
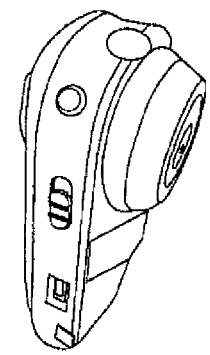
Figure 9E:
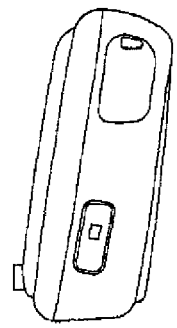
Figure 9F:
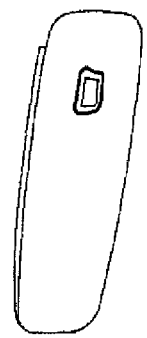

From FIG. 9A shows a typical night light, while FIG. 9B shows a device with multiple camera heads, which can easily fit within the approximate dimensions of the night light. FIG. 9C shows a night vision digital video device with a motion sensor that can be upgraded for auto tracking. FIGS. 9E and 9F show extra small and slim digital recording devices that can be incorporated into a lighting device according to the principles of the invention.

Figure 10A:
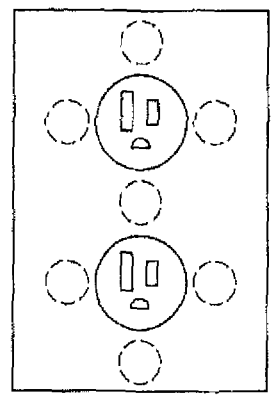
FIGS. 10A and 10B show an embodiment of the current invention which uses a plurality of suction cups to reinforce the prong means and hold a super heavy device on a wall outlet cover plate in the form of a light device having a built-in DV or camera-assembly, wireless-system to connect cloud, or memory cards and optional wireless communication device(s).
Figure 10B:
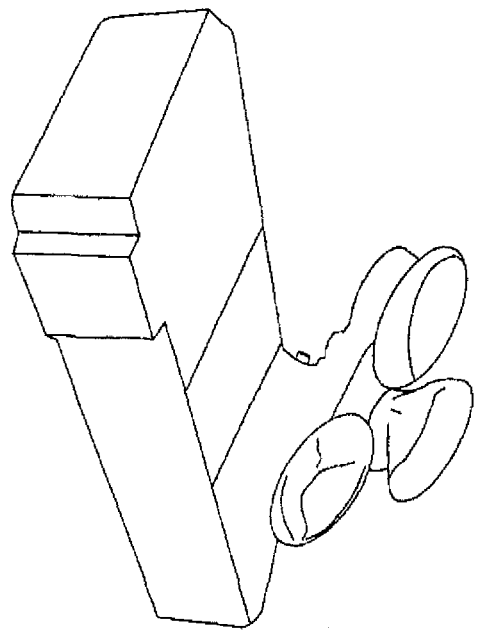
Figure 11A:
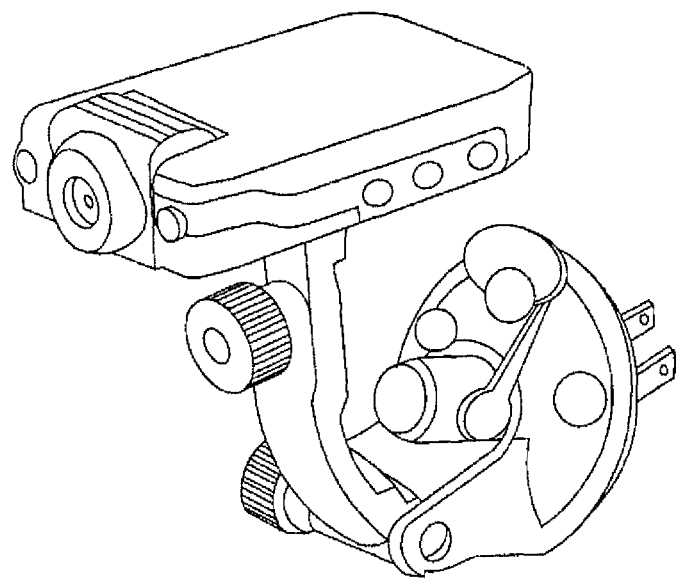
FIGS. 11A and 11B show another embodiment with a plurality of suction cups for a light device having a built-in DV or camera-assembly, wireless-system to connect cloud, or, memory cards and optional wireless communication device(s) with display or monitor to see a recorded image or sound.
Figure 11B:
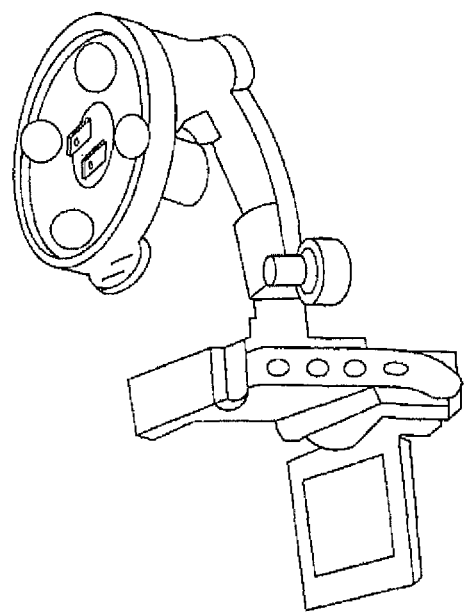

From FIG. 10A show the location where suction cups will attach on a wall outlet cover plate, shown in FIG. 10B, to support the extra weight of a combined DV device and lighting fixture when directly plugged into a wall outlet. FIGS. 11A and 11B show alternative DV devices arranged, according to the principles of the invention, to be plugged into a wall outlet and to be supported, as necessary, by additional suction cups.

From FIGS. 12A, 12B, 12C, 12D, 12E show a separate motion sensor-unit or camera-assembly (100) having a built-in digital data device, including one or more of a camera(s) (102), digital data storage kit, motion sensor (101), camera (102), hidden-antenna (103), antenna (107), memory card (108), SD card (108), micro SD card (108), IR motion module (109-3), Bluetooth module (112), wireless module (113), control module, photo sensor module, circuit (111) (112) (113) and conductive wires (110), wireless communication set, WiFi, controller (104), and circuit. The built-in camera(s) (102) may have a wide detection angle and a hidden location to protect people's home, residence, office, or small business, as well as an optional IR (109-3) night vision optics kit to help people take the photos in a low or no brightness environment while also allowing use of a separated housing LED or other light source with brighter light to take photos or video in the low or no brightness environment to provide a more colorful and nicer image.

From FIG. 12A shows a separate motion sensor unit or camera-assembly (100) that is wired to the security light set by conductive wires (110) using an install kit or adjustable kit (105) such as a tube, hoe, retractable bar, empty linear tube, and so forth. The separate motion sensor unit or camera-assembly (100) has at least one built-in camera(s) which has preferred functions and a motion sensor (101) and has preferred photo-sensor built inside the motion sensor Fresnel-lens that fits within the separate motion sensor unit housing and the installation kits to fixed the motion sensor unit or camera-assembly on the LED light device main base as FIG. 12-F, 12-G, 12-H, 12-I, 12-J, 12-K show base (B-1) or the said motion sensor unit or camera-assembly sell individual to non-camera security light to replace and upgrade to motion security light with built-in camera assembly can wireless send the camera-captured digital data through wifi or wifi-extend go through 3/4/5G internet or other network to cloud and owner of phone or computer use downloaded APP with software to make screen image operation, comparison, detection, calculation, tracing the moving persons, merchandise, objects and use downloaded APP with preferred software or computer pre-programmed software to operate desired work and send back the owner instruction from APP or computer software back to LED light or camera-assembly for setting, adjust, performance, changing . . . etc.

From FIG. 12B shows the separate motion sensor unit or camera-assembly (100) with a screw-in or snap-tight or any kind of market-existing connector similar with FIG. 12-E (127'), joint-piece similar with FIG. 12-E (127') which similar with all kind of motion security light source house's base joint-piece to make joint or assembly with or connect with receiving-end or terminal or adaptor's end of LED light main base as FIGS. 12F to 12K shown base, also the separate motion sensor unit or camera-assembly (100) to connect with a power source, and which has a built-in camera (102), built-in wireless communication assembly's hidden antenna (103), and related electric circuit module (shown in FIG. 12E) to allow the separate motion sensor unit or camera-assembly (100) to send out a wireless digital data to preferred receiving ends such as a mobile phone or other wireless communication equipment, computer, or wireless receiving ends or equipment.

From FIG. 12-B, When the separate motion sensor unit or camera-assembly (100) assembled-with or screw-in and insert-into any light fixture or LED light device receiving socket or terminal to get powered by a LED light or LED lamp receiving end, holder, lamp base, lamp socket, other receiving-end, the home lighting may not turn on at night time, because the motion sensor unit or camera-assembly (100) having a built-in camera will lose power when the lamp holder has no power. As a result, the motion sensor unit or camera-assembly (100) has to have a backup battery (109-1) or energy storage device (109-1) to supply sufficient power to the motion sensor unit or camera-assembly (100) when lamp holder no power while turned off or during a power failure. Alternative, The lamp holder power motion sensor unit or camera-assembly (100) also preferably has to have IR night vision module to help take clear photos during a power fail or lamp holder power-off.

As shown in FIG. 12B, a LED light or lamp device has main base (B-1) as shown on FIGS. 12-F to 12-K which utilizes AC current for home, office, or residence. The separate motion sensor unit or camera-assembly (100) has no light source so have to assemble with any light device or lighting light source. The said separate motion sensor unit or camera-assembly (100) has at least one camera or multiple cameras (102) with connectable screw-in end or terminal or end similar with FIG. 12-E (127'), or a screw-in with tip-connector (109-1) to connect with any receiving-end of lighting fixture or LED lighting to install together and get sufficient brightness for camera capture colorful digital data. The said LED light fixture or lamp has the AC electricity to drive the separate motion sensor unit or camera-assembly (100), but while the lamp holder power is shut down or during a power failure time, the motion sensor unit or camera-assembly (100) or will use a backup energy storage device such as rechargeable batteries or another energy device to supply sufficient power to the LED light or LED lamp main base separate motion sensor unit or camera-assembly (100). Alternative, The LED light or LED lamp main base motion sensor unit or camera-assembly (100) also has IR night vision for use during the power fail or power off time period to allow people to take photos.

From FIG. 12-B, The separate motion sensor unit or camera-assembly (100) has no built-in any light source so need to assembled with any light source or any lighting device and assembled into one of bulb-socket for indoor application, and motion sensor unit or camera-assembly (100) has built-in rechargeable batteries (109-1) and can be charged while the people turn on the any light source to charge the said motion sensor unit or camera-device, or the recharge device can be charged by solar power or wind-power while use for outdoor application.

FIG. 12C shows the separate motion sensor unit or camera-assembly (100) having a wireless communication antenna (107) on an outside housing area to get better wireless communication capability than the FIG. 12B hidden antenna. Also, FIG. 12C shows the motion sensor (101), camera (102), memory card in an SD or micro SC card or other market available memory kit's slot (108), the separate motion sensor being powered by conductive wires (110) with installation kits or adjustable kits (105) to help the separate motion sensor unit or camera-assembly (100) be well installed at any lighting or light device main-base as FIGS. 12F to 12K shown or other desired location(s).

FIG. 12D shows the separate motion sensor unit or camera-assembly (100) having a plug-in prong to supply power. The prongs may be retracted so that the sensor unit or assembly (100) can easily be carried to anywhere. The wireless communication antenna (107) also can be quickly taken apart and re-assembled when traveling or packing to reduce the packing size. The separate motion sensor unit or camera-assembly (100) has a desired circuit combination to provide different functions as required by the market. For cost consideration, the lowest cost model may only have a PIR motion sensor or moving detector(s) hardware and its software (111), while an upgrade will include a PIR motion sensor or moving detector(s) hardware and its software (111) and a Bluetooth module (112), and an additional upgrade will include a PRI motion sensor or moving detector(s) hardware and its software (111), connect with Cloud, apply the downloaded APP with software or a Bluetooth module (112), and a wireless communication assembly (113).

Yet another upgrade will include the PIR motion sensor or moving detector(s) hardware and its software (111), connect with Cloud, apply the downloaded APP with software or Bluetooth module (112), wireless communication assembly (113), and additional communication means including a speaker (not shown) to enable talking with people or supply objects with sound so that people will stay at the camera location.

FIG. 12E shows the detailed construction of the said separate motion sensor unit or camera-assembly (100), which has a front case (120) having openings (120-1) to install the motion sensor head (123-1) and photo sensor head (123) on the PIR module (122), and also second openings (120-2) to install a camera head provided on a camera module (124) with a camera lens (125). An upgraded model can include a connection with Cloud, apply the downloaded APP with software or Bluetooth and/or wireless communication module (126), depending on market requirements, and more functions can be added to obtain even higher grade motion sensor specifications and functions. The back case has several screws or fastener kits to assemble the front case and back case together. Inner housing adjustment kits or joining kits (127) connect with outside adjustment or joining kits (127') to enable the separate motion sensor unit to be installed, and the angle, position, or orientation to be adjusted as desired.

The inner empty space of the adjustment or joining kits (127) (127') allows electric wires to connect with circuitry and a power source. The wireless antenna (129) can be threaded into an inner holder (not shown) to quickly install, take-apart, and re-assemble wireless communication models. In this preferred embodiment, the separate motion sensor can have multiple circuits and modules, each of which has its own functions, which may include (a) a motion sensor and photo sensor module, (b) a Bluetooth module, (c) a wireless communication module, (d) a connection system to cloud storage station or memory card module, (e) a sound module, (f) a recorder sound module for capturing sound, (g) a camera module or camera-assembly for visible capture functions, (h) a SIM card device, (i) a wireless communication system to connect with cloud through wifi, internet to phone owner download APP with software to let people to handle camera captured digital data and people operated the captured digital data by predetermined software including screen-selection, comparison, identification, recognition, tracing, calculation, payment, purchase or other pre-designed following work as above discussed, and send out instruction from phone software go through internet, wifi and received by LED light device to make setting, adjust, answer, reply, select-functions, (j) backup batteries or a power storage device to enable uninterrupted operation during a power failure. In addition, the separate motion sensor can have any desired electric parts, accessories, and/or IC chip(s) to enable operation of all of the different functional modules and circuits to carry out the predetermined functions, performance, and effects. The electric parts and accessories may include at least one part or accessory selected from a motion sensor, photo sensor, speaker, memory storage device, camera device, video capture device, sound capture device, Bluetooth device, wireless communication device, SIM card (for wireless communications to send out phone, email, alerts, or messages through the Internet a wireless network, or a telecommunication system), a conductive wire, prongs, and a backup battery (to provide a backup power source during a power failure), FIGS. 12-F, 12-G, 12-H, and 12-I show an AC powered, wired or plug-in. motion sensor security light which has Par38 or Par30 or other preferred light sources (L1) or an LED light source (L2) to offer super bright light beams when motion or heat has been detected by the motion sensor (M1), which is installed on the base (B1) with an adjustable frame, arms, or a joining-piece (F1) to enable adjustment of the angle, position, or orientation of the camera (C1) of the digital data device, which can take photos or video upon turning on the super bright light beams to help provide illumination in a dark environment and take colorful photos or video for storage inside a memory storage device such as an SD or micro SD card.

The adjustable frame, arms, or joining-piece (F1) enables the camera module to be easily installed, added-on, taken-apart, and re-assembled so that a non-camera motion sensor security light can be easily upgraded to the current invention's built-in camera motion sensor security light using the same adjustable frame, arms, or joining-piece (F1). The market available non-camera security light has limited types of base and frame, arms, or joining-piece, so that it is very simple to make universal kits to replace or upgrade from a non-camera motion sensor unit to the built-in camera motion sensor module. In addition, the camera kits also can have their own housing if required to enable a camera-module to be put on the separate unit for special customer-made applications, which are not limited to a security light, but rather can include the applications disclosed in the inventor's U.S. patent application Ser. No. 14/265,838, filed Apr. 30, 2014, Ser. No. 14/265,738, filed Apr. 30, 2014, and Ser. No. 13/295,301, filed Nov. 15, 2011, now U.S. Pat. No. 8,760,514, each of which is incorporated herein by reference, and well as any other kind of lighting fixtures.

From FIG. 12-F, 12-G, 12-H, 12-I show the AC or DC powered by wired or plug-in or other power source connector as FIG. 9G model for all kind of market motion/moving detectors sensor security light which has Par38 or Par30 or other preferred light source (L1) or LED light source (L2) to offer the super bright light beam while the motion or moving or heat been detected by motion sensor or moving detector(s) (M1) which are install on the base (B1) with adjustable frame or arms or join-piece (F1) so can adjust the angle, position, orientation of the said camera (C1) and each of light source (L1) (L2) of the said LED security light has built-in base (B1) or separated housing camera-assembly (M1 also called sensor-unit) will take colorful or even Full HD or 4K or 8K image or photos or video at the same time and get super bright light beam help at the dark environment to take a colorful photos or video and storage inside memory storage device such preferred SD or MicroSD card for low-end products without any wireless system, or wireless transmitting through wifi or wifi—extend or-and internet, 3/4/5G network to the cloud storage station for phone owner download APP with software to make instruction, selection, operation for all possible and preferred following work as above discussed.

The FIG. 12-F, 12-G, 12-H, 12-I show the motion sensor or moving detector(s) (M1) is install on the base (B1) or install inside separated housing (M2), and camera-assembly fit into base (C1), or (C3) install on the separated camera-assembly or called sensor-unit housing.

From FIG. 12-F, 12-G, 12-H, 12-I, 12-J show all kind of motion sensor or moving detector (M1) (M2) or camera-assembly install base (C1)(C2) or separated housing (C3) or other installation should all fall within the current invention scope for motion sensor LED Security light for variety construction for FIG. 12-F, 12-G, 12-H, 12-I, 12-J, 12-K for all construction for different arrangement for LED light source, Camera-assembly, Power connection, power type (AC or DC or solar Power or storage power device or rechargeable battery). It is appreciated any other LED security light has same function has LED light source to supply the brightness to help camera-assembly to take color image or-and audio digital data and use wife go through 3/4/5G or-and internet to wireless delivery digital data to cloud to let people use download APP with software from internet to control the LED light or-and camera-system to make following work while owner of phone to use APP software to wireless through 3/4/5G or internet with optional SIM card to give instruction back to wifi and wifi-extend to LED security light for setting, adjustment, selected-areas, comparison, calculation, tracing, recording video, take photos, send out audio data, ring bell; should fall within the current invention without any limitation basing on limited embodiments or FIGS. 12-F, 12-G, 12-H, 12-I, 12-J, 12-K show variety combination, arrangement, examples. Any equal functions or alternative or replacement still fall within the current invention which is not same as all US prior art before current invention parent filed on November 2011 with current invention with all update skill or technical including cloud, download APP with software, give back all instruction by APP with software to send back instruction or operate following work.

From the FIG. 12H is one of the preferred the current invention's separated camera-assembly or called motion sensor has built-in camera (C3) which has adjustable frame or arms or join-piece (F1) so can make easily install, add-on, take-apart, re-assembly for all the market available non-camera security light so can replace the non-camera motion sensor to the current invention's built-in camera motion sensor.

From FIG. 12H other application is to use the same adjustable frame or arms or join-piece (F1) to make this upgrade from Non-camera security light become to built-in camera motion sensor security light instantly.

The market available non-camera security light has limited type of base and frame, arms, join-piece so it is very simple to make universal kits to make the replace or upgrade from non-camera motion sensor unit to the built-in camera motion sensor module.

Some time, the camera kits also can has its own housing if required so can make the camera-module also put on the separate unit for special customer-made application is not limited for current invention for security light or more wide as parent filing U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

From FIGS. 12-I to 12-K show more than 23 of some preferred embodiments which has different light source (L1) (L2), motion/moving sensor or moving detector (M1) (M2), Base (B1) (B2), Frame or arms or joint piece (F1), adjustable arms and kits (ADJ), camera-assembly (C1) (C2) (C3), optional DC or other type DC power source (Solar1) (Solar2) or outside transformer or AC power source (not shown) for different constructions, detachable motions/moving product/unit, different motion sensor (Flat or dome or half-ball). Some of embodiment, the power is from DC power source which is solar (Solar 1) (Solar 2) or the inner backup batteries (see FIG. 12-E (126-1) shown for power fail time use).

From FIG. 12-J can see the solar power module (Solar-2) which can use wired or wireless to offer the power to the said separate housing which has built-in camera-unit (C3) and motion sensor or moving detectors (M2) and detected the moving or heat of the moving object(s) and use the inner wire or wireless assembly and kits to deliver or transmit the electric signal to the light device (L2) here is preferred is LED light source (L2) to install on base (B1) to form a complete security light products, and/or send the wireless transmitting digital data though the inner SIM-card or preferred wireless-system to connect with wifi and go through market available 3/4/5G internet or internet or other telecommunication channels to send digital data such as email, message, data, image, sound, alarm to people's mobile phone, computer, security system, police station to know the house, residence, office, business area's situation further more can electric wireless multiple-ways communication talk and send out all video or audio data to all parties which more than 2 ways wireless communication or send out pre-determined signals to other device to do pre-determined works, functions.

FIG. 12-F, 12-G, 12-H, 12-I, 12-J, 12-K, show 5+18=total 23 different parts and accessories embodiment of current invention's preferred models to upgrade the current market available non-camera motion sensor security which has different light source, construction, number of light units, shape, brightness, sensor range, sensor distance has built-in Motion sensor or separate motion sensor, or separated wireless motion sensor unit, has IR night vision or without the IR night vision.

All these preferred embodiments for FIG. 12-F, 12-G, 12-H, 12-I, 12-J, 12-K are some of preferred embodiment for the whole sets of the motion security light but not limited to these embodiments.

The current invention for above FIG. 12-A to 12-K drawing and detail description is not a new issues basing on the Parent filing which cover all the lighting device as parent filing details listed on U.S. patent application Ser. No. 14/265,838, filed Apr. 30, 2014, which is a continuation-in-part of U.S. patent application Ser. No. 14/265,738, filed Apr. 30, 2014, which is a continuation-in-part of U.S. patent application Ser. No. 13/295,301, filed Nov. 15, 2011, now U.S. Pat. No. 8,760,514, each of which is incorporated herein by reference. to cover all kind of lighting fixture.

FIG. 12K which is similar with FIG. 12-F to 12J show other 18 preferred assortment for light source, built-in or separated motion sensor or moving detectors products/unit (M1), camera-assembly (C1) (C2) (C3), LED light source or unit (L1) (L2), main-base (B1) (B2), adjustable arms and kits (ADJ), solar or other DC power source (Solar1)(solar2), frame or arms or joint piece (F1) those are similar with FIG. 12-F to 12-J to incorporate with the built-in wireless transmitter-device to connect the Wi-Fi or-and Wi-Fi-extender device or-and more router to get the best functions for far-distance between the outdoor security light to the Wi-Fi or-and router device and apply the Wi-Fi-extender device to increase the distance to make sure the distance and walls do not block-out too much electric-delivery as FIG. 12J showed the more than one Wi-Fi or-and Wi-Fi-extender or-and more router units.

From FIG. 12K show all preferred 18 different shape, construction, size, brightness, number of LED-light unit(s), built-in transmitter-device, or-and separated housing motion/moving products/units which can assembled with LED light device base which is attached on the wall. These 18 preferred embodiment and 5 embodiment of FIG. 12F to 12J has brief construction. It is appreciated any similar or replaceable or equal functions construction or concept or applications should still fall within the current and all above discussed parent filed case idea, scope, concept, design features and should be fall within current invention and all parent filed cases' claims.

FIGS. 12F, 12G, 12H, 12I, 12J, 12K show, by way of example and not limitation, some of the current invention's preferred models to upgrade the current market available non-camera motion sensor security light, which can have different light sources, construction, number of light units, shapes, brightness, sensor range, and sensor distance, and which can have a built-in motion sensor or separate motion sensor, or separate wireless motion sensor unit, and which may or may not have IR night vision.

FIG. 12K show some market-available styles of motion sensor security light, which may be applied to the current invention's built-in motion sensor with light source unit and base, or the current invention's discrete and separate motion sensor with light source kits or light source base, and which is sold by itself without the light source kits.

FIG. 13 shows a preferred embodiment which has a different power source having a built-in sensor selected from a motion sensor, moving sensor, photo sensor, vibration sensor, sound sensor or other market available sensor, an IC chip and circuit(s) to provide at least one or any combination of the above-listed functions, and a camera or video device selected from, for example, a car driving cam or body cam such as a Sony camera, Go-pro, Drive-cam, IP cam, or outdoor security camera with optional updated electric features such as facial recognition and identification, gait recognition and identification, and other human body recognition and identification capabilities with wired or wireless connections via the Internet, WiFi, or a wireless communication transmitting and receiving device to let people receive digital data, messages, photos, screens, sound or talk to protect a house, office, warehouse, residence, or other location with the best security, as well as an optional wireless controller, app controller, or Z-wave controller to program and control other equipment, devices, and home appliances.

FIG. 13 shows an embodiment of the current invention having a power source (1) selected from (AAA) AC 120V current supplied through prongs (1-1), a screw-in base (1-2) with wire (1-3) to deliver the 120 Volt AC current through an inner AC-to-DC circuit to become DC current, or (BBB) a power source (1) from the backup energy storage device (1-4) including rechargeable batteries which fit into the current invention's housing for DC power supply during a power failure. Both DC current sources are incorporated with a preferred sensor (2) including, by way of example and not limitation, the illustrated photo sensor (2-1), motion sensor (2-2), moving sensor (2-3), shock sensor (2-4), sound sensor (2-5) or other market available sensors for use with a car driving camera, home security camera, computer IP cam, or exercise IP camera. The DC current works with the sensor to drive a preferred IC and related circuit(s) and electric parts to cause the camera to record and communicate images and video in multiple ways, by wired or wireless communications, to people's phone, computer, monitor, screen, TV, or display, the communications equipment including by way of example and not limitation, WiFi, Internet, z-way, a wireless control box, 3G or 4G wireless networks to help people get audio, video, messages, digital data, images, sound, and face, body, and walking images through an electric recording and storage device such as tape recorder, memory storage device, SD card, mini SD card, micro SD card, USB-unit, memory stick or digital storage kit. This allows people to check the status of the preferred device's installation location or surrounding conditions and take predetermined actions, solutions or arrangements.

The preferably hidden camera built-into the indoor lighting or outdoor lighting device can include a night-vision photo-diode help to get the black and white image or without the night-vision photo-diode in addition to the lighting device light beam that enables a colorful image to be captured when the sensor device has been triggered. The photo sensor (2-1) may be a very simple sensor which causes the built-in digital device to start or stop using the IR LEDs or photo diode to take black and white photos or video. Because the built-in camera needs some help for a fully dark or too dark night time environment, any kind of photo sensor can give electric signals to the system to start to turn-on the IR LEDs or photo diode when the environment has already become dark. At dawn, day light will cause an electric signal to turn off the IR photo-diode.

The motion sensor (2-2) preferably is a PIR sensor because it has a long range of up to 100 feet or more, and therefore can sense a tiny object's heat source. This is not like the moving sensor (2-3) which detects movable objects using software in the camera system or the photo-diode to detect a brightness difference, but this kind of moving sensor only has limited distance and range and therefore is best for a small space or rooms. However, other considerations as to whether to use the motion or moving sensor include power consumption and the number of days the sensor can be operated.

The shock sensor (2-4), also known as a vibration sensor, can sense any air-flow or vibration of the light device to trigger the camera to start to take photos and video, and to deliver messages, data, sound, and images through a wired or wireless device to a phone, computer, monitor, or screen.

The sound sensor (2-5) can sense the door closing, steps, talking, and other sounds to trigger the built-in light device or hidden-camera inside the lighting device to start to take and record photos or video, and transmit the photos and video to a display, phone, computer, or monitor.

Other market available sensors include, but are not limited to, at least one or any combination of a (2-6) smoke sensor, (2-7) carbonate air sensor, (2-8) flood sensor, (2-9) fire sensor, (2-10) laser network sensor for an x-y-z axis network, and (2-11) other market available types of sensor.

Some applications such as the wall mounted security light which is connected with an AC 120 Volt power source can have their own outdoor lighting switch or no switch, and may even have no need for a motion sensor to save parts and the cost of the motion sensor. The light device may incorporate the motion sensor to take photos, images, and face video all the time without stop because the wired 120V AC serves as an unlimited power source.

The preferred functions, which follow triggering of the sensor and turning on the light, include but are not limited to (a) dark or nighttime colorful image capture by the camera, (b) image capture with a time delay for example three photos, then video for two seconds or another time period, and storage into a memory storage device such as an SD card or micro SD card, or (c) tracking by the camera using a tracking device that may include a motor, multiple motion sensors, and IC chip so as to track moving objects for a desired period of time until the moving object stops movement. The light device can be an outdoor security light which has a 180 or 270 degree motion sensor device and which is located in a driveway or at the sides/corner of a house to allow the house owner to see any moving objects surrounding the house under dark or nighttime or even daytime conditions to provide the best home security. Especially good security is provided by outdoor lighting that includes a security light at a higher position than a surrounding housing or garden light installed on the ground because a bad man will not be mask at outdoor locations, making identification easier in order to best protect the house, office, or other properties.

After the sensor has been triggered an IR LED or photo diode can also be turned on for use in a dark/nighttime environment to enable the built-in camera to take black and white images as well as sound, and to record, deliver, and transmit the images and sound by wireless communication device to a phone, computer, monitor, or screen. The IR LED or photo diodes can be any number from 1 to N. The IR LEDs or IR photodiodes are optional depending on whether colorful images, which need a bright light source, or black and white images which can use IR LEDs or photodiodes, are preferred. An IR LED or photo diode requires extra cost and extra power consumption, which is a consideration as to whether to add IR for the lighting device or not. Recently, a special camera been developed with a high tech optic-lens to take very clear and colorful photos and video under very dark environments, using a SONY optics lens assembly with inside sensor and related circuitry, so that there is no need for IR photo diode(s) or super bright light to provide area illumination. However, this kind of dim-light camera with its optics lens is more expensive than regular models. The current invention may use either bright light illumination for take video data, or add an IR photodiode to help the camera take a clear video, image, or photos, or use a night vision optic-lens with inner sensitive circuit to take very colorful and bright photos, video or digital data. It is appreciated all of these options still fall within the scope of the current invention.

Video is turned on after the sensor is triggered so that the built-in at least one camera can take photos or video or both to capture images or movies for storage or delivery or wireless transmission by wires, WiFi, Internet, or a 3G/4G wireless network. The video transmitted by wireless preferably uses WiFi, Internet, or a 3G/4G wireless network to supply the video to a phone or computer. It also can use wires to deliver the images or video to a monitor or screen at nearby locations but not for long distances because people do not like to pay for hardwire cost or to walk more than 5-10 minutes. Specifications of the camera, such as night vision, distance, height, pixels, infrared, filters, ASA, particle size, image size, camera size, lens size, optics-lens assembly size, color, sharpness, HD 1080 or other grades of pixel, zoom in and out, auto focus, and so forth, can be selected from select from market-available types including regular, high-end or hidden cameras which have a tiny camera head and lens assembly.

Audio is turned on after the sensor is triggered by activating at least one speaker or microphone for recording, speech or talk, playing music, activating a siren, triggering an alarm system, or auto dialing a police station and playing pre-recorded words, etc. The audio system also can have multiple-ways of communication including, but not limited to, chat, talking, or conversation in response to any condition for which people need to have sound, words, messages, chat, or talking through an audio system.

WiFi is turned on after the sensor is triggered so that a built-in IC, circuit, software, app, or program will activate the WiFi or Internet or wireless system, a wired system, or a 3G/4G wireless network, to send out signals, sound, messages, texts, images, alarms, sirens, auto-dialed phone messages, emails, skype, lines, we chats, Instagrams, or other digital data to a pre-programed receiver, including but not limited to, a phone, communication device, computer device, consumer electric device, monitor, screen, display, iPhone, iPad or other portable electric device(s)

The SIM-card may be turned on after the sensor is triggered so that the built-in IC, circuitry, software, app, and/or program(s) will activate a SIM-card to auto-dial a phone to send out words, sound, signals, messages, text, images, or voice to any pre-set person's electric equipment, including all kinds of communication devices, computer devices, consumer electric devices, iPhones, and iPads via a wireless network and transmit or receive the digital data.

The Zigbee may be turned on (4-7) after the sensor is triggered to control any of a variety of Z-wave electric appliances, equipment, lights, curtains, TVs, cooking machines, kitchen devices, air conditioning, electric door systems, microwaves, coffee machines, heaters, showers, sprinklers, smoke alarms, carbon-oxide alarms, garden faucet systems to turn on or turn off with a preset duration time or time period to prevent hazards or give people convenience and protect their property or safety.

The video-on, audio-on, WiFi and app-on, SIM card-on, and Zigbee on functions enable messages, images, photos, words, and sound to be recorded and saved into a memory card, which may include but is not limited to an SD card, micro-SD card or any memory storage means including the cloud, while incorporating wireless capabilities utilizing WiFi, apps with software, a SIM card, the Internet, an electric signal network, a 3G or 4G wireless network, or other updated wireless techniques. The cheapest option is to save or store the digital data, sound, image, photos into a cheap device that only has a memory card slot and in which everything needs to be stored inside the memory card, with no wireless kit. A medium cost device has a memory card slot with everything recorded and saved into the memory card and also wireless communications for WiFi or an app to enable downloading or checking of the digital data from a phone. The high-end device may have a desired memory card slot that can store all digital data, with WiFi and an app that can transmit a large amount of digital data to a cloud storage bank without having to worry that the saved digital data inside the memory card or memory storage device has been taken by a bad man. This is an important feature and provides a big improvement over out-of-date digital data storage that is only inside the device.

In the wired monitor on feature discussed above, the sensor triggers the IC or pre-set program to instantly turn on a monitor, screen or display to show the area's condition or status to appropriate people such as security or safety authorities to take instant action with respect to any crisis, hazard, or dangerous things that might happen.

The above-described functions may be applied to a car driving camera, sporting camera, outdoor police or security camera system, GoPro, Sony camera, HTC camera, Apple camera, or hidden camera with existing or updated functions. But it is to be appreciated that any alternative, replaceable, improved, or equivalent power supply, sensor, or IC/circuit, used to carry out these functions may be substituted. Any changes, replacement, or alternatives, such as elimination of a sensor such as a photo-sensor, motion sensor, moving detector or sensor, shock sensor, and sound sensor in order to have the built-in camera operate for 24 hours continuously to take audio or video and send out wired or wireless messages, data, images, and/or sound to people may still fall within the current invention scope.

It is also to be appreciated that the sensors as discussed above may include but are not limited sensors other than those listed above and that other sensor functions and combination thereof may still fall within the scope of the current invention.

FIG. 13 shows a lighting device having a built-in digital data device that may include but is not limited to a camera (1300), which may be hidden or not, and at least one of (1301) memory storage kits, (1302) a wireless transmit and receiver, (1303) an audio device, (1304) a light source, (1305) IR-LEDs or IR photodiodes, (1306) a video device, (1307) WiFi, (1308) a loud speaker, (1309) wireless communication kits, (1310) a SIM-card for wireless communication, (1311) a z-wave device(s), (1312) a wired monitor, (1313) all kinds of sensor, (1314) all kinds of IC, (1315) app software, (1316) Bluetooth kits, (1317) a timer, (1318) a smoke or fire detector, (1319) a carbon-oxide detector, (1320) a moving detector, (1321) a motion detector, or another electric device(s) that can be adapted for use with all market-available car, sport, body, and outdoor camera parts and accessories. The current invention applies these kits and preferred assemblies for home security and incorporates them with all kinds of light sources or lighting devices so that it offers people a colorful and very clear image during day and night time to provide protection for properties or house or life from a bad man, optionally with wired or wireless transmission to security or police authority to save billions of dollars in reduced crime.

The current invention also offers models which can be installed into any existing bulb base, bulb holder, bulb adaptor to eliminate the need for an electrician to install, which is super expensive.

The current invention also offers a super low cost safety device having wireless communication and/or app communications over worldwide distances to remotely control or remotely monitor houses, residences, or properties without having to pay a traditional monthly fee to know what happened while away from home or out of town. The expensive monthly security fee needs to be paid from the day the house is bought until the day the house is sold. In contrast the current invention can provide wireless communication through the Internet or phone, wireless network via a SIM-card to offer instant status for properties including a house, building, shop, office, or relative's house, which offers people better protection than any current police system. The pre-warning sign "Smile, Camera recording now!!" will scare all bad guys away from people's properties to provide the best protection ever.

FIG. 14 shows a motion sensor head PIR, which replaces analog data with digital data to save a lot of electric parts and accessories, as well as bonding, and soldering, and which avoids the need to change from analog data or signals to digital data or signals in order to avoid electric signal interference with wireless WiFi or wireless signals that can cause false operation. This is another optional feature of the current invention. VDD and Vout at the top of FIG. 14 show are connected to the motion sensor head, which can be directly connected with a relay to cause the light source to turn on without interfering with the wireless transmission or reception or WiFi signal. The traditional analog motion sensor has an analog signal which will strong interference or be affected by the wireless signal transmitting or receiving, resulting in false or wrong functions. The current invention is, however, not limited to a digital data output motion sensor head or PIR that prevents interference between light source and wireless communication. It also can save some cost by using an analog-to-digital data IC and other electric parts and accessories, including a transistor, diode, resistor, or capacitor, which may be connected by techniques such as IC bonding or soldering, to change an analog electric signal to digital electric signals. This is another important feature of the current invention. The preferred digital data motion sensor head or PIR may be a NICERA JAPAN model PSH2-323-4 or a Sharp or other electric company's similar or equivalent digital data motion sensor head or PIR that uses a digital electric signal output in association with digital wireless communication to avoid wrong functions.

An analog output of the motion sensor head or PIR will cause mutual interference with the light source or wireless communication device, resulting in the need for a special blocking wall, blocking metal, or shelter to prevent the analog signals from being mutually affected by the wireless device. This is another big cost and therefore analog is not preferred, even though it will still fall within the current invention's scope.

In summary, the invention provides a light device having a built-in digital data device powered by an AC unlimited power source that supplies unlimited power to the device or a big capacity of DC electricity to supply sufficient power to the device, the digital data device including at least one camera having means for capturing images, data, or sound at a desired shooting angle, resolution, color, brightness, and sharpness, and at least one of a means for storing the images, data, or sound into a memory and means for transmitting the images, data, or sound to at least one of a communication device, computer device, phone, receiver device, and display device, the digital data device further including at least one component selected from lenses, optical components, electrical components, mechanical components, circuitry, an integrated circuit (IC), data delivery means, data storage means, a USB port, a cable, a microphone, record means, display means, sensor means, PIR means, IR means, night vision means, flash means, a switch means, motion detect means, sound detect means, a photo sensor, a motor, and tracking means. The light device includes a housing and means for emitting light beams, and is supplied with power from the power source by circuitry including at least one of a controller, switch, sensor, conductors, integrated circuit, remote controller, and wireless communication means, The light device may be selected from a night light, desk lamp, floor lamp, down light, ceiling light, track light, security light, projection light, flashlight, outdoor light, indoor light, LED light fixture, LED light bar, LED picture light, LED closet light, LED door light, and LED garage light, The light device may be an LED motion sensor light, LED power failure light, LED light with auto tracking, LED patio light, and LED light device, and may be connected with the power source by prongs, a conductive wire with a plug extending from the light device, a USB adaptor, a transformer device, and an inductor device.

In a preferred embodiment, the device may be in the form of an insert forming a lamp holder with a socket having desired lamp socket specifications, said insert being arranged to be inserted into an existing light fixture.

The light device may have multiple functions in addition to the sensing, camera, communication, and lighting functions, such as a portable or hand-carry flashlight function, and may include a compartment for extendably, retractably, foldably, or transformably installing accessories that provide more than one function.

The light device's digital data means may include sensor means having more than one sensor head and an integrated circuit for controlling an auto tracking assembly that enables the camera to track moving objects or persons, and/or may include multiple cameras for capturing images of different locations.

The light device's unlimited or big AC power source may be an electrical utility power supply system for supplying electricity to homes, residences, and businesses.

The invention may utilize a webcam having an auto tracking means and power supply connected to an unlimited power source or to a USB interface, the webcam including at least one camera head having means for capturing images, data, or sound at a desired shooting angle, resolution, color, brightness, and sharpness, a motor, and sensor means for causing the move the camera head to follow a moving object or person, and means for storing or transmitting data captured by the camera head to one of a display, computer, communication device, phone, Internet, website, e-mail, or auto dialing system. The webcam may include a USB adaptor for connection to a computer or communication equipment with a USB port, with the webcam being activated when connected with the power source to carry out predetermined image capture functions and to capture digital data under predetermined environmental conditions.

The Light device's webcam may include suction cups for mounting the webcam to a computer screen or housing, and multiple camera heads for simultaneously viewing multiple areas, as well as a lighting device or devices having additional functions.

In this embodiment, the light device's webcam may further includes prong means for directly plugging the webcam into an electrical outlet, and weight supporting means for supporting the webcam on the outlet, said weight supporting means including at least one of the following: at least one suction cup, glue, double-sided tape, a hook and loop fastener, an adhesive, a chemical compound, a connector, an adaptor, and a fitting means, and may be arranged to operate at night or in low light.

I claim:

1. A motion sensor security light having a built-in camera, comprising:
    at least one housing adapted to be installed in an LED light source selected from (a) a plurality of LED-units and/or (b) chip-on-board (COB) LED-units having a desired brightness and functions controlled by circuitry and/or at least one integrated circuit;
    a light source and/or circuitry included within the housing and supplied with power through a base of the housing;
    a space for receiving a removable memory card;
    a communication device; and
    at least built-in one camera assembly included within the at least one housing and connected with a power source, said camera capturing data including at least one of image, video, and audio data and performing at least one of the following functions:
    a. saving the captured image, video, and audio data into the removable memory card, or
    b. wirelessly transmitting, by the communication device, the captured image, video, and audio data into a cloud storage device or bank, or
    c. transmitting, by the communication device, the captured image, video, and audio data by one of wired and wireless communication to another communication device, computing device, phone, receiver device, and/or display device,
    wherein the camera assembly and light source are activated by at least one of a motion sensor, and/or a moving device, and/or a passive infrared (PIR) detector, and
    wherein the captured image, video, and audio data is digital data for download into a memory and/or the another communication device, computing device, phone, receiver device, and/or display device by at least one of Bluetooth, WiFi, app software, a wired communication system, a wireless communication system, and/or a 4G or 5G network.

2. A motion sensor security light having a built-in camera as claimed in claim 1, wherein the light is at least one of an LED light having at least one LED-unit inside and a shape that is similar to a conventional, commercially available light bulb, parabolic aluminized reflector (PAR) bulb, compact fluorescent (CFL) bulb, light emitting diode (LED) bulb, LED dot-matrix bulb, LED panel, and LED light device.

3. A motion sensor security light having a built-in camera as claimed in claim 1, wherein the security light device includes at least one housing and the camera assembly and light source are triggered by a moving object and/or by body-temperature detection.

4. A motion sensor security light having a built-in camera as claimed in claim 1, wherein the camera assembly includes an optics-lens assembly and an integrated circuit (IC) for capturing images, data, and sound at a desired shooting angle, distance, resolution, color, brightness, pixel resolution, and sharpness, and at least one storing assembly for storing the images, data, and sound into said memory card or cloud storage device.

5. A motion sensor security light having a built-in camera as claimed in claim 1, wherein the light device includes at least one of a controller, switch, motion detector, conductors, integrated circuit (IC), remote controller, AC-to-DC circuit, DC-to-DC circuit, prongs, screw-base, and wireless communication system.

6. A motion sensor security light having a built-in camera as claimed in claim 1, wherein security light is one of a DC-powered light device, an AC-powered light device, an AC-powered plug-in light device, and an AC-powered device that fits into a lamp holder.

7. A motion sensor security light having a built-in camera as claimed in claim 1, wherein the captured image, video, and audio data is wirelessly transmitted by a wireless transmission device through at least one of a 3G/4G/updated wireless network, WiFi, a router, and a Z-wave device.

8. A motion sensor security light having a built-in camera as claimed in claim 1, wherein the security light has more than one function and is connected with the power source by at least one of prongs, a lamp base, conductive terminals, a conductive wire, a conductive wire with a plug, a USB adaptor, a transformer device, a power fail backup power storage device, and an inductor device for wireless charging inner power kits.

9. A motion sensor security light having a built-in camera as claimed in claim 1, wherein the built-in camera assembly is activated in at least one of the following ways: activated by the motion sensor, activated by a timer for at least one predetermined period of time, and activated by at least one additional sensor selected from a photo sensor, heat sensor, smoke sensor, carbon dioxide sensor, fire sensor, light sensor, shock sensor, and vibration sensor.

10. A motion sensor security light having a built-in camera as claimed in claim 1, wherein the motion sensor is included in a discrete, separate unit or housing from the light device.

11. A motion sensor security light having a built-in camera as claimed in claim 1, wherein the motion sensor and/or camera related parts and accessories are installed in a non-camera security light to upgrade the non-camera security light to a security light having motion sensing with a desired combination of the camera and/or storage and/or wireless functions.

12. A motion sensor security light having a built-in camera as claimed in claim 1, wherein the motion sensor unit is a separate-unit from the camera assembly or the at least one LED-unit or COB unit.

13. A motion sensor security light having a built-in camera as claimed in claim 1, wherein the camera is arranged to capture color images in low light without activating the light source and without requiring an IR photodiode.

14. A motion sensor security light, comprising:
at least one adjustable angle lamp holder having a light source connected with a power source, wherein the light source is at least one of a light bulb, parabolic aluminized reflector (PAR) bulb, compact fluorescent (CFL) bulb, light emitting diode (LED) bulb, LED dot-matrix bulb, LED panel, and LED light device; and
at least one built-in camera assembly that is built into the adjustable angle lamp holder for capturing image, video, and/or audio data and saving the captured image, video, and/or audio data and into a removable memory card and/or cloud memory device and/or cloud storage device, and
a device for transmitting the captured image, video, and audio data to at least one of a cloud storage bank, a communication device, computing device, phone, receiver device, or display device,
wherein the camera assembly and light source are activated by at least one of a motion sensor and/or a moving device and/or a passive infrared (PIR) detector.

15. A motion sensor security light as claimed in claim 14, wherein the lamp holder has at least one of an adjustable angle, orientation, and direction, a socket, terminals, contacts and said light source.

16. A motion sensor security light as claimed in claim 14, wherein the security light device has at least one third function which is non-lighting and non-camera function including at least a multiple-way talking function, a remote adjustment or setting function, an emergency dial function, and/or an auto-send alarm function.

17. A motion sensor security light as claimed in claim 14, wherein the motion sensor is included in a sensor-unit having more than one sensor head, an integrated circuit, and/or the moving device for controlling an auto tracking assembly that enables the camera to track moving objects/persons.

18. A motion sensor security light as claimed in claim 14, wherein said camera assembly includes more than one camera for capturing images of different locations and that is arranged (a) to take color images under low brightness conditions without an IR photodiode or activation of the light source while using a high-tech camera device, and/or (b) to capture black and white images using an IR photodiode, and/or (c) to take color photos or video under bright light supplied by activating the light source.

19. A motion sensor security light as claimed in claim 14, wherein the lamp holder has a screw base to get power from commercially available existing bulb base contacts or terminals to install an existing light source with a screw-base.

20. A motion sensor security light as claimed in claim 14, further including a built-in back-up power source for providing power during a power outage and provide continuous power to the motion sensor security light.

21. A motion sensor security light as claimed in claim 14, wherein the power source is an electrical utility AC power supply system for supplying electricity to homes, residences, and businesses.

22. A motion sensor security light as claimed in claim 14, wherein the power source is one of a DC electrical current from a rechargeable or non-rechargeable DC energy storage device, solar power supply system, wind generator, other power generator, USB charger or USB power bank, or an outside transformer.

23. A motion sensor security light as claimed in claim 14, wherein the memory card includes a slot for a removable SD card or micro SD card.

24. A motion sensor security light as claimed in claim 14, wherein the motion sensor is included with a camera assembly inside of a separate and discrete digital data device or unit or housing that is retrofit and installed onto at least one of an existing security light without a camera, digital data storage, and wireless transmitting function.

25. A motion sensor security light as claimed in claim 16, wherein the light device includes a compartment for extendably/retractably/foldably/transformably installing accessories that provide said at least one non-lighting function and that use wireless communication to provide at least one of multiple-party communication, control, conversation, angle adjustment, focusing, brightness control, signal transmission, and other non-lighting functions.

26. A motion sensor security light as claimed in claim 16, wherein the light device includes a space in at least one housing for installing accessories that provide said at least one non-lighting function and that use wireless communication to provide at least one of multiple-party communication, control, conversation, angle adjustment, focusing, brightness control, signal transmission, and other non-lighting functions.

27. A replacement motion sensor unit with a built-in camera assembly, comprising:
- a separate housing that is installed in an existing non-camera light device to replace an existing motion sensor unit, the replacement motion sensor unit being connected with a non-camera light device circuit to activate a light source of the existing non-camera light device and the built-in camera assembly when motion is detected;
- the replacement motion sensor unit including a replacement motion sensor and at least one built-in camera assembly, the at least one built-in camera assembly including:
  - a camera for capturing captured image, video, and audio data, and at least one of the following devices for saving and/or transmitting the captured image, video, and audio data:
    - a digital data storage device for storing the captured image, video, and audio data into a removable memory device or card or a cloud storage device; and/or
    - a digital data device incorporated with downloading device for downloading the captured image, video, and audio data to at least one of a communication device and/or display equipment; and/or
    - a wireless communication device for transmitting the captured image, video, and audio data by WiFi and/or a 3G, 4G, 5G, or other network using email, Skype™ messenger, WhatsApp™ message, or other transmission system for sending digital data, messages, sound, and/or images to communication devices including a mobile phone, computer, monitor via a wireless network,
- wherein the replacement motion sensor unit with built-in camera assembly is arranged to be connected with the existing non-camera light device circuit and power source including at least one of an AC and/or DC power source by one of prongs, a lamp base, a lamp socket, a conductive wire, a conductive wire with a plug, a USB adaptor, a transformer device, and an inductor device for wireless charging of an inner power storage device.

28. A motion sensor as claimed in claim 27, has at least one housing or base arranged to fit into and receive power from the existing non-camera light device, the light device including an existing lamp holder, lamp base, or lamp socket.

29. A motion sensor as claimed in claim 27, further comprising an IR night vision device for enabling capture of low light images in the absence of light from the light device.

30. A motion sensor as claimed in claim 27, the further comprising a DC power source for supplying power to the motion when an AC power source has failed.

* * * * *